United States Patent
Sonobe et al.

(10) Patent No.: US 10,797,319 B2
(45) Date of Patent: Oct. 6, 2020

(54) PRODUCTION METHOD FOR CARBONACEOUS MATERIAL FOR NON-AQUEOUS ELECTROLYTE SECONDARY BATTERY ANODE, AND CARBONACEOUS MATERIAL FOR NON-AQUEOUS ELECTROLYTE SECONDARY BATTERY ANODE

(71) Applicant: Kureha Corporation, Tokyo (JP)

(72) Inventors: Naohiro Sonobe, Tokyo (JP); Kazuhiko Shimizu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 53 days.

(21) Appl. No.: 15/501,982

(22) PCT Filed: Aug. 10, 2015

(86) PCT No.: PCT/JP2015/072667
§ 371 (c)(1),
(2) Date: Feb. 6, 2017

(87) PCT Pub. No.: WO2016/021737
PCT Pub. Date: Feb. 11, 2016

(65) Prior Publication Data
US 2017/0237070 A1    Aug. 17, 2017

(30) Foreign Application Priority Data

Aug. 8, 2014    (JP) ................. 2014-163111

(51) Int. Cl.
| | | |
|---|---|---|
| *H01M 4/587* | (2010.01) |
| *H01M 4/36* | (2006.01) |
| *C01B 32/05* | (2017.01) |
| *H01M 4/04* | (2006.01) |
| *H01M 4/133* | (2010.01) |
| *H01M 4/1393* | (2010.01) |
| *H01M 4/62* | (2006.01) |
| *H01M 4/66* | (2006.01) |
| *H01M 10/0525* | (2010.01) |
| *H01M 4/02* | (2006.01) |

(52) U.S. Cl.
CPC ............ *H01M 4/587* (2013.01); *C01B 32/05* (2017.08); *H01M 4/043* (2013.01); *H01M 4/0404* (2013.01); *H01M 4/133* (2013.01); *H01M 4/1393* (2013.01); *H01M 4/36* (2013.01); *H01M 4/623* (2013.01); *H01M 4/625* (2013.01); *H01M 4/661* (2013.01); *H01M 10/0525* (2013.01); *C01P 2004/80* (2013.01); *C01P 2006/40* (2013.01); *H01M 2004/021* (2013.01); *H01M 2004/027* (2013.01)

(58) Field of Classification Search
CPC .. C01B 31/02; C01P 2004/80; C01P 2006/40; H01M 10/0525; H01M 2004/021; H01M 2004/027; H01M 4/0404; H01M 4/043; H01M 4/133; H01M 4/1393; H01M 4/36; H01M 4/587; H01M 4/623; H01M 4/625; H01M 4/661

See application file for complete search history.

(56) References Cited

U.S. PATENT DOCUMENTS

| 5,176,969 A | 1/1993 | Miyabayashi et al. |
| 5,616,436 A | 4/1997 | Sonobe et al. |

(Continued)

FOREIGN PATENT DOCUMENTS

| CN | 1255244 A | 5/2000 |
| CN | 1692522 A | 11/2005 |

(Continued)

OTHER PUBLICATIONS

Yada et al., Aug. 24, 2001, J-Plat Pat, machine translation, JP 2001-229926 A (Year: 2001).*

(Continued)

*Primary Examiner* — Adam A Arciero
(74) *Attorney, Agent, or Firm* — Birch, Stewart, Kolasch & Birch, LLP

(57) ABSTRACT

An object of the present invention is to provide a non-aqueous electrolyte secondary battery that has a large charge/discharge capacity, has a small irreversible capacity, which is the difference between the doping capacity and the de-doping capacity, and is capable of effectively using an active material. The problem described above can be solved by a method for producing a carbonaceous material for a non-aqueous electrolyte secondary battery anode, the method including: (1) an alkali metal compound impregnating step of adding an elemental alkali metal or a compound containing an elemental alkali metal to a carbonaceous precursor to obtain an alkali-impregnated carbonaceous precursor; (2) a heat treatment step of: (a) obtaining a heat-treated product by performing main heat treatment on the alkali-impregnated carbonaceous precursor at 800° C. to 1500° C. in a non-oxidizing gas atmosphere, or (b) obtaining a heat-treated product by performing pre-heat treatment on the alkali-impregnated carbonaceous precursor at a temperature of not lower than 400° C. and lower than 800° C. in a non-oxidizing gas atmosphere and then performing main heat treatment at 800° C. to 1500° C. in a non-oxidizing gas atmosphere; and (3) coating the heat-treated product with pyrolytic carbon.

13 Claims, No Drawings

(56) References Cited

U.S. PATENT DOCUMENTS

| | | | |
|---|---|---|---|
| 5,985,489 A | 11/1999 | Ohsaki et al. | |
| 5,989,744 A | 11/1999 | Yamaura | |
| 6,303,249 B1 | 10/2001 | Sonobe et al. | |
| 6,316,144 B1 | 11/2001 | Xue et al. | |
| 6,335,122 B1 | 1/2002 | Yamada et al. | |
| 6,686,048 B1 | 2/2004 | Arimoto et al. | |
| 7,759,289 B2 | 7/2010 | Iwasaki et al. | |
| 7,858,239 B2 | 12/2010 | Shimizu et al. | |
| 8,728,668 B2 | 5/2014 | Kawai et al. | |
| 8,926,932 B2 | 1/2015 | Pfeifer et al. | |
| 2002/0048144 A1* | 4/2002 | Sugo | H01G 9/155 361/502 |
| 2002/0061445 A1 | 5/2002 | Kitagawa et al. | |
| 2005/0152890 A1 | 7/2005 | Sonobe et al. | |
| 2005/0266990 A1 | 12/2005 | Iwasaki et al. | |
| 2006/0078796 A1 | 4/2006 | Ozaki et al. | |
| 2007/0287068 A1 | 12/2007 | Shimizu et al. | |
| 2008/0207442 A1 | 8/2008 | Pfeifer et al. | |
| 2008/0274406 A1 | 11/2008 | Fuse et al. | |
| 2009/0297953 A1 | 12/2009 | Shimizu et al. | |
| 2010/0069507 A1 | 3/2010 | Tabata et al. | |
| 2010/0086856 A1 | 4/2010 | Matsumoto et al. | |
| 2010/0297500 A1 | 11/2010 | Kawai et al. | |
| 2011/0111294 A1* | 5/2011 | Lopez | H01M 4/134 429/217 |
| 2012/0070733 A1 | 3/2012 | Yamada et al. | |
| 2012/0328954 A1 | 12/2012 | Okabe et al. | |
| 2013/0003261 A1 | 1/2013 | Remizov et al. | |
| 2013/0302692 A1 | 11/2013 | Suzuki et al. | |
| 2014/0030601 A1 | 1/2014 | Tano et al. | |
| 2014/0050982 A1 | 2/2014 | Lu et al. | |
| 2014/0080004 A1 | 3/2014 | Imaji et al. | |
| 2014/0178761 A1 | 6/2014 | Lu et al. | |
| 2014/0356708 A1 | 12/2014 | Arikawa et al. | |
| 2015/0024277 A1† | 1/2015 | Komatsu | |
| 2015/0171470 A1 | 6/2015 | Kobayashi et al. | |
| 2015/0180020 A1 | 6/2015 | Komatsu et al. | |
| 2015/0263347 A1* | 9/2015 | Imaji | H01M 4/587 429/231.8 |
| 2015/0357637 A1 | 12/2015 | Yamanoi et al. | |
| 2016/0064735 A1 | 3/2016 | Tada et al. | |
| 2016/0268590 A1 | 9/2016 | Koshima et al. | |
| 2017/0125811 A1 | 5/2017 | Imaji et al. | |
| 2017/0141380 A1 | 5/2017 | Aoki et al. | |
| 2017/0141396 A1 | 5/2017 | Tabata et al. | |
| 2017/0229708 A1* | 8/2017 | Sonobe | H01M 4/587 |
| 2017/0237070 A1 | 8/2017 | Sonobe et al. | |
| 2017/0237071 A1* | 8/2017 | Sonobe | H01M 4/587 429/231.4 |
| 2018/0261875 A1* | 9/2018 | Imaji | H01M 4/133 |

FOREIGN PATENT DOCUMENTS

| | | |
|---|---|---|
| CN | 1705148 A | 12/2005 |
| CN | 10120909381 A | 7/2008 |
| CN | 102630355 A | 8/2012 |
| CN | 103415948 A | 11/2013 |
| CN | 103477478 A | 12/2013 |
| CN | 103500815 A | 1/2014 |
| CN | 103887475 A | 6/2014 |
| CN | 103936003 A | 7/2014 |
| CN | 104641499 A | 5/2015 |
| CN | 106133953 A | 11/2016 |
| EP | 0700105 A2 | 3/1996 |
| EP | 2 144 321 A1 | 1/2010 |
| EP | 2892096 A1 | 7/2015 |
| EP | 3 128 582 A1 | 2/2017 |
| JP | S57208079 A | 12/1982 |
| JP | S58209864 A | 12/1983 |
| JP | 3-252053 A | 11/1991 |
| JP | 8-64207 A | 3/1996 |
| JP | 8-236116 A | 9/1996 |
| JP | 9-7598 A | 1/1997 |
| JP | 9-115520 A | 5/1997 |
| JP | H09204918 A | 8/1997 |
| JP | 2000-315500 A | 11/2000 |
| JP | 2000315500 A † | 11/2000 |
| JP | 2000-327441 A | 11/2000 |
| JP | 2001-229926 A | 8/2001 |
| JP | 2001229926 A * | 8/2001 |
| JP | 2002-104817 A | 4/2002 |
| JP | 2002-241117 A | 8/2002 |
| JP | 2002241117 A * | 8/2002 |
| JP | 2002241117 A † | 8/2002 |
| JP | 2005-132702 A | 5/2005 |
| JP | 2006264991 A | 10/2006 |
| JP | 2006264993 A | 10/2006 |
| JP | 2008-10337 A | 1/2008 |
| JP | 2008-297201 A | 12/2008 |
| JP | 2010-509174 A | 3/2010 |
| JP | 2013-534024 A | 8/2013 |
| JP | 2014/504781 A | 2/2014 |
| JP | 2016-152222 A | 8/2016 |
| JP | 2016-178049 A | 10/2016 |
| KR | 2002-0009514 A | 2/2002 |
| KR | 10-2009-0016462 A | 2/2009 |
| KR | 10-2013-0008532 A | 1/2013 |
| KR | 10-2013-0062291 A | 6/2013 |
| KR | 10-2015-0030731 A | 3/2015 |
| TW | 200501484 A | 1/2005 |
| TW | 200723579 A | 6/2007 |
| TW | 200945651 A | 11/2009 |
| WO | WO9701192 A1 | 1/1997 |
| WO | WO 98/44580 A1 | 10/1998 |
| WO | WO 2004/114443 A1 | 12/2004 |
| WO | WO 2005/098999 A1 | 10/2005 |
| WO | WO 2008/058231 A2 | 5/2008 |
| WO | WO 2011/056847 A2 | 5/2011 |
| WO | WO 2011/148156 A1 | 12/2011 |
| WO | WO 2012/087698 A1 | 6/2012 |
| WO | WO 2013/118757 A1 | 8/2013 |
| WO | WO 2014/034857 A1 | 3/2014 |
| WO | WO 2014/034858 A1 | 3/2014 |
| WO | WO 2014/038492 A1 | 3/2014 |
| WO | WO 2014/038494 A1 | 3/2014 |
| WO | WO-2014034857 A1 * | 3/2014 ............ H01M 4/587 |
| WO | WO 2014/112401 A1 | 7/2014 |
| WO | WO 2015/059892 A1 | 4/2015 |
| WO | WO 2016/021737 A1 | 2/2016 |

OTHER PUBLICATIONS

Tokumitsu et al., Feb. 13, 2001, J-Plat Pat, machine translation, JP 2002-21117 A (Year: 2001).*

Extended European Search Report dated Apr. 13, 2017, in European Patent Application No. 15830384.2.

Communication Pursuant to Rule 114(2) EPC dated Apr. 17, 2018, in European Patent Application No. 15830384.2.

Notification of Reason for Refusal dated Apr. 18, 2018, in Korean Patent Application No. 10-2017-7003065, with English translation.

International Search Report of PCT/JP2015/072667 dated Nov. 10, 2015.

Office Action dated Apr. 19, 2016, in Taiwan Patent Application No. 104123322, with English translation.

Notification of Reasons for Refusal issued to JP Patent Application No. 2016-540771, dated Dec. 5, 2017, with English language translation.

Office Action issued to EP Patent Application No. 15830384.2, dated Jan. 24, 2018.

Chinese Office Action and Search Report for Chinese Application No. 201580041493.6, dated Sep. 5, 2018, with English translation.

Chinese Office Action and Search Report for Chinese Application No. 201580042307.0, dated Oct. 9, 2018, with English translation.

European Communication pursuant to Article 94(3) EPC for European Application No. 15829774.7, dated Jan. 25, 2018.

Extended European Search Report for European Application No. 15829774.7, dated Apr. 18, 2017.

Extended European Search Report for European Application No. 15830721.5, dated Jun. 20, 2017.

(56) References Cited

OTHER PUBLICATIONS

International Search Report (Form PCT/ISA/210) for International Application No. PCT/JP2015/072666, dated Nov. 10, 2015, with English translation.
International Search Report (Form PCT/ISA/210) for International Application No. PCT/JP2015/072668, dated Nov. 10, 2015, with English translation.
Japanese Office Action for Japanese Application No. 2016-540770, dated Dec. 5, 2017, with English translation.
Japanese Office Action for Japanese Application No. 2016-540772, dated Jan. 23, 2018, with English translation.
Japanese Office Action for Japanese Application No. 2016-540772, dated Jul. 24, 2018, with English translation.
Japanese Office Action for Japanese Application No. 2016-540772, dated Oct. 10, 2017, with English translation.
Taiwanese Office Action and Search Report for Taiwanese Application No. 104123319; dated Oct. 11, 2016, with English translation.
Taiwanese Office Action and Search Report for Taiwanese Application No. 104123324, dated Jan. 4, 2017, with English translation.
U.S. Office Action for U.S. Appl. No. 15/501,970, dated Jul. 12, 2018.
U.S. Office Action for U.S. Appl. No. 15/502,024, dated Sep. 17, 2018.
Korean Notice of Reason for Rejection (including an English translation thereof) issued in the Korean Patent Application No. 10-2017-7003070 dated Jan. 21, 2019.
Chinese Office Action and Search Report, dated Oct. 9, 2018, for Chinese Patent Application No. 201680050003.3.
Chinese Office Action, dated Apr. 19, 2019, for Chinese Application No. 201680050003.3, with English translation.
Extended European Search Report, dated Jul. 25, 2018, for European Application No. 16851319.0.
International Preliminary Report on Patentability and English translation of the Written Opinion of the International Searching Authority, dated Apr. 3, 2018, for International Application No. PCT/JP2016/077881.
Korean Office Action, dated Jun. 16, 2018, for Korean Patent Application No. 10-2018-7006096.
U.S. Office Action, dated May 16, 2019, for U.S. Appl. No. 15/756,183.
U.S. Office Action, dated Nov. 6, 2018, for U.S. Appl. No. 15/756,183.
Chinese Office Action and Search Report for Chinese Application No. 201580042307.0, dated Apr. 4, 2019, with English translation.
Korean Office Action for Korean Application No. 10-2017-7003245, dated Feb. 18, 2019, with English ttranslation.
U.S. Office Action for U.S. Appl. No. 15/502,024, dated Mar. 6, 2019.
European Patent Office Communication pursuant to Article 94(3) EPC issued in European Patent Application No. 15830384.2 dated Sep. 17, 2019.
U.S. Office Action, dated Aug. 29, 2019, for U.S. Appl. No. 15/756,183.
European Communication pursuant to Article 94(3) EPC for European Application No. 15830384.2, dated May 26, 2020.
Extended European Search Report for European Application No. 20159601.2, dated May 29, 2020.

\* cited by examiner
† cited by third party

PRODUCTION METHOD FOR CARBONACEOUS MATERIAL FOR NON-AQUEOUS ELECTROLYTE SECONDARY BATTERY ANODE, AND CARBONACEOUS MATERIAL FOR NON-AQUEOUS ELECTROLYTE SECONDARY BATTERY ANODE

TECHNICAL FIELD

The present invention relates to a method for producing a carbonaceous material for a non-aqueous electrolyte secondary battery anode, and a carbonaceous material for a non-aqueous electrolyte secondary battery anode. With the present invention, it is possible to provide a carbonaceous material for a non-aqueous electrolyte secondary battery anode exhibiting a high discharge capacity and excellent charge/discharge efficiency.

BACKGROUND ART

As the high functionality of small portable devices such as mobile telephones or laptop personal computers progresses, increases in the energy density of secondary batteries used as the power supplies thereof have been expected. Patent Document 1 proposes a non-aqueous solvent-type lithium secondary battery with a high energy density, which includes a carbonaceous material as an anode.

In recent years, large secondary batteries, having high energy density and excellent output characteristics, are being mounted on electric vehicles in response to increasing concern over environmental issues. For example, increasing use of non-aqueous electrolyte secondary batteries has been expected in vehicle applications such as in electric vehicles (EV), which are driven by solely motors, and plug-in hybrid electric vehicles (PHEV) and hybrid electric vehicles (HEV) in which internal combustion engines and motors are combined. In particular, lithium-ion secondary batteries, which are non-aqueous solvent-type lithium secondary batteries, are widely used as secondary batteries having high energy density, and further increases in energy density thereof are expected in order to extend the driving distance with one charge in EV applications.

High energy density requires a high doping and de-doping capacity of lithium in the anode material, but the theoretical lithium storage capacity of graphitic materials that have been mainly used presently is 372 Ah/kg, and there are theoretical limits. Furthermore, if an electrode is formed using a graphitic material, a graphite intercalation compound is formed when the graphitic material is doped with lithium, which increases the interlayer spacing. The interlayer spacing returns to original spacing as a result of de-doping the lithium doped between layers. Therefore, with a graphitic material having an advanced graphite structure, repeated doping and de-doping of lithium (repeated charging and discharging in the secondary battery) causes a repeated increase and return of interlayer spacing, which tends to lead to the breakdown of graphite crystals. Accordingly, secondary batteries including graphite or a graphitic material having an advanced graphite structure are said to have poor charging and discharging repeating characteristics. Furthermore, in batteries having such an advanced graphite structure, a problem has been indicated in which the electrolyte solution tends to degrade easily when a battery is operated.

On the other hand, alloy-based anode materials containing tin, silicon, or the like have also been proposed as materials having high capacity; however, the durability is insufficient, so the use of such materials is limited.

In contrast, non-graphitizable carbon has excellent durability and has a high capacity exceeding the theoretical lithium storage capacity per unit weight. Accordingly, various proposals have been made for such materials as high-capacity anode materials. For example, Patent Document 2 proposes the use of a carbonaceous material obtained by heat treating a phenol resin as an anode material for a secondary battery. However, when an anode is produced using a carbonaceous material obtained by heat treating a phenol resin at a high temperature of 1900° C. or higher, for example, there is a problem that the doping and de-doping capacity of the active material such as lithium into the anode carbon is small. In addition, when an anode is produced using a carbonaceous material prepared by heat-treating a phenol resin at approximately 480 to 700° C., for example, the doping amount of lithium serving as an active material is large, which is preferable. However, there is a problem that the lithium that has been doped in the anode carbon is not completely de-doped, and a large amount of lithium remains in the anode carbon. This causes the lithium serving as an active material to be consumed wastefully.

In addition, in the production process of a carbonaceous material, a production method for carbon for a lithium secondary battery has been proposed, the production method including the steps of: obtaining halogenated dry-distilled carbon by bringing a halogen-containing gas into contact with dry-distilled carbon; a de-halogenating step of obtaining a de-halogenated carbon by removing some or all of the halogens in the halogenated dry-distilled carbon; and a pore preparation step of bringing the de-halogenated carbon into contact with pyrolytic hydrocarbon (Patent Document 3). With this method, although a high doping and de-doping capacity is achieved, there is a problem that the lithium that has been doped in the anode carbon is not completely de-doped, and a large amount of lithium remains in the anode carbon, which causes the lithium serving as an active material to be consumed wastefully.

CITATION LIST

Patent Literature

Patent Document 1: Japanese Unexamined Patent Application Publication No. S57-208079A
Patent Document 2: Japanese Unexamined Patent Application Publication No. S58-209864A
Patent Document 3: WO 97/01192
Patent Document 4: Japanese Unexamined Patent Application Publication No. H9-204918A
Patent Document 5: Japanese Unexamined Patent Application Publication No. 2006-264991A
Patent Document 6: Japanese Unexamined Patent Application Publication No. 2006-264993A
Patent Document 7: Japanese Unexamined Patent Application Publication No. 2000-327441A

SUMMARY OF INVENTION

Technical Problem

An object of the present invention is to provide a non-aqueous electrolyte secondary battery that has a large charge/discharge capacity, has a small irreversible capacity, which is the difference between the doping capacity and the de-doping capacity, and is capable of effectively utilizing an active material. Another object of the present invention is to provide a carbonaceous material for a secondary battery electrode to be used in the battery described above, and a production method thereof.

Solution to Problem

The present inventors obtained a carbonaceous material by adding an elemental alkali metal or a compound containing an elemental alkali metal to a carbonaceous precursor and then heat treating the obtained carbonaceous precursor. The present inventors discovered that a non-aqueous electrolyte secondary battery having a high discharge capacity can be obtained by using the obtained carbonaceous material as an anode for a secondary battery. Furthermore, the present inventors considered that an even higher discharge capacity could be achieved by increasing the added amount of the compound containing the elemental alkali metal. However, as described in Comparative Example 3, when the added amount of the alkali metal compound is increased too much, the specific surface area becomes large, which makes electrode production itself difficult.

The present inventors conducted dedicated research on non-aqueous electrolyte secondary batteries having an even greater charge/discharge capacity and a smaller irreversible capacity. As a result, the present inventors made the surprising discovery that an anode of a non-aqueous electrolyte secondary battery including a carbonaceous material obtained by adding a compound containing an elemental alkali metal, performing heat treatment, and then coating the heat-treated carbon with pyrolytic carbon exhibits a high discharge capacity.

The present inventors further discovered that in the case of a carbonaceous precursor having a small added amount of an alkali metal compound, the charge/discharge efficiency of a secondary battery including a carbonaceous material obtained by coating the heat-treated carbon with a pyrolytic carbon is enhanced.

The present invention is based on such knowledge.

Therefore, the present invention relates to the following:

[1] A method for producing a carbonaceous material for a non-aqueous electrolyte secondary battery anode, the method including:

(1) an alkali metal compound impregnating step of adding a compound containing an elemental alkali metal to a carbonaceous precursor to obtain an alkali metal compound-impregnated carbonaceous precursor (also called an "alkali-impregnated carbonaceous precursor" hereafter) (this step is also called an "alkali impregnating step" hereafter);

(2) a heat treatment step of:

(a) obtaining a heat-treated product by performing main heat treatment on the alkali-impregnated carbonaceous precursor at 800° C. to 1500° C. in a non-oxidizing gas atmosphere, or (b) obtaining a heat-treated product by performing pre-heat treatment on the alkali-impregnated carbonaceous precursor at a temperature of not lower than 400° C. and lower than 800° C. in a non-oxidizing gas atmosphere and then performing main heat treatment at 800° C. to 1500° C. in a non-oxidizing gas atmosphere; and (3) coating the heat-treated product with pyrolytic carbon.

[2] The method for producing a carbonaceous material for a non-aqueous electrolyte secondary battery anode according to [1], the method further including (4) performing heat treatment at 800° C. to 1500° C. in a non-oxidizing gas atmosphere.

[3] The method for producing a carbonaceous material for a non-aqueous electrolyte secondary battery anode according to [1] or [2], wherein an added amount of the compound containing an elemental alkali metal in the alkali-impregnated carbonaceous precursor (also called an "alkali impregnating amount") is not less than 5 wt. %.

[4] The method for producing a carbonaceous material for a non-aqueous electrolyte secondary battery anode according to any one of [1] to [3], wherein the heat treatment step (2)(a) is (2) a heat treatment step of (a1) performing main heat treatment on the alkali-impregnated carbonaceous precursor at 800° C. to 1500° C. in a non-oxidizing gas atmosphere and then removing alkali metals and compounds containing elemental alkali metals by washing; or the heat treatment step (2)(b) is (2) a heat treatment step of (b1) performing pre-heat treatment on the alkali-impregnated carbonaceous precursor at a temperature of not lower than 400° C. and lower than 800° C. in a non-oxidizing gas atmosphere, removing alkali metals and compounds containing elemental alkali metals by washing, and then performing main heat treatment at 800° C. to 1500° C. in a non-oxidizing gas atmosphere to obtain a heat-treated product, or (b2) performing pre-heat treatment on the alkali-impregnated carbonaceous precursor at a temperature of not lower than 400° C. and lower than 800° C. in a non-oxidizing gas atmosphere, performing main heat treatment at 800° C. to 1500° C. in a non-oxidizing gas atmosphere, and then removing alkali metals and compounds containing elemental alkali metal by washing to obtain a heat-treated product.

[5] The production for producing a carbonaceous material for a non-aqueous electrolyte secondary battery anode according to any one of [1] to [4], wherein the carbonaceous precursor contains a petroleum pitch or tar, a coal pitch or tar, a thermoplastic resin, or a thermosetting resin as a carbon source.

[6] A carbonaceous material for a non-aqueous secondary battery anode obtained by the production method according to any one of [1] to [5].

[7] The carbonaceous material for a non-aqueous secondary battery anode according to [6], wherein a true density is from 1.20 g/cm$^3$ to 1.60 g/cm$^3$, a specific surface area determined by a BET method using nitrogen adsorption is not greater than 30 m$^2$/g, an average particle size is not greater than 50 μm, and an atom ratio (H/C) of hydrogen atoms to carbon atoms determined by elemental analysis is not greater than 0.1.

[8] An anode for a non-aqueous electrolyte secondary battery containing the carbonaceous material according to [6] or [7].

[9] A non-aqueous electrolyte secondary battery containing the carbonaceous material according to [6] or [7].

Patent Document 4 discloses a carbonaceous material containing from 0.1 to 5.0 wt. % of at least one type of an alkali metal, an alkaline earth metal, and phosphorus in terms of element content. In secondary batteries including these carbonaceous materials, a high charge/discharge capacity was not achieved. In addition, Patent Documents 5 and 6 disclose carbon materials obtained by supporting an alkali metal-containing compound on the surface of a resin composition or the like and then subjecting the compound to carbonization. However, in secondary batteries including these carbon materials, a high charge/discharge capacity was not achieved.

Advantageous Effects of Invention

The carbonaceous material for a non-aqueous electrolyte secondary battery anode of the present invention is thought to have a pore structure suitable for storing lithium and a surface structure with low reactivity. Therefore, the carbonaceous material has a high doping capacity and de-doping capacity, and the irreversible capacity arising at the time of initial doping and de-doping can be further reduced. By using the carbonaceous material of the present invention as an anode material, it is possible to obtain a non-aqueous electrolyte secondary battery having a high energy density.

In particular, when a compound containing an elemental alkali metal is added at a high concentration, it is effective to coat the carbonaceous material with pyrolytic carbon, and it is possible to achieve a high charge/discharge capacity. Furthermore, when a compound containing an elemental alkali metal is added at a low concentration, the charge/discharge efficiency was surprisingly enhanced by coating the carbonaceous material with pyrolytic carbon.

In addition, increases in specific surface area can be suppressed in the carbonaceous material for a non-aqueous electrolyte secondary battery anode of the present invention by removing alkali metals and compounds containing elemental alkali metals after pre-heat treatment.

DESCRIPTION OF EMBODIMENTS

[1] Method for Producing a Carbonaceous Material for a Non-Aqueous Electrolyte Secondary Battery Anode The method for producing a carbonaceous material for a non-aqueous electrolyte secondary battery anode according to the present invention includes: (1) an alkali-impregnating step of adding a compound containing an elemental alkali metal to a carbonaceous precursor to obtain an alkali-impregnated carbonaceous precursor; (2) a heat treatment step of (a) obtaining a heat-treated product by performing main heat treatment on the alkali-impregnated carbonaceous precursor at 800° C. to 1500° C. in a non-oxidizing gas atmosphere, or (b) obtaining a heat-treated product by performing pre-heat treatment on the alkali-impregnated carbonaceous precursor at a temperature of not lower than 400° C. and lower than 800° C. in a non-oxidizing gas atmosphere and then performing main heat treatment at 800° C. to 1500° C. in a non-oxidizing gas atmosphere; and (3) coating the heat-treated product with pyrolytic carbon.

Alkali-Impregnating Step (1)

In the alkali-impregnating step (1), a compound containing an elemental alkali metal is added to a carbonaceous precursor.

Carbonaceous Precursor

The carbonaceous precursor serving as a carbon source of the carbonaceous material of the present invention is not particularly limited as long as the material is a carbon material which assumes a composition having a carbon element content of not less than 80 wt. % when heat-treated at not lower than 1100° C. in a non-oxidizing atmosphere.

When the carbonization yield of the carbonaceous precursor at 1100° C. is too low, the proportion of the elemental alkali metal or the alkali metal compound with respect to the carbonaceous precursor becomes excessive in the heat treatment step (2) described below, and this causes a reaction such as an increase in specific surface area, which is not preferable. Therefore, the carbonization yield when the carbonaceous precursor is heat-treated at 1100° C. in a non-oxidizing atmosphere is preferably not less than 30 wt. %, more preferably not less than 40 wt. %, and even more preferably not less than 50 wt. %.

In this specification, the carbonaceous precursor is not particularly limited, but the atom ratio (H/C) of hydrogen atoms to carbon atoms is preferably not less than 0.05, more preferably not less than 0.15, and particularly preferably not less than 0.30. A carbon precursor having an H/C of less than 0.05 is thought to be heat-treated prior to alkali impregnating. Even if such a carbon precursor is subjected to alkali impregnating, the elemental alkali metal or the like cannot be sufficiently impregnated into the carbon precursor. Therefore, even when heat treatment is performed after alkali impregnating, it may be difficult to form sufficient pores that would enable the doping and de-doping of a large amount of lithium.

The carbon source of the carbonaceous precursor is not particularly limited, but examples include petroleum pitch or tar, coal pitch or tar, thermoplastic resins (for example, ketone resins, polyvinyl alcohol, polyethylene terephthalate, polyacetal, polyacrylonitrile, styrene/divinylbenzene copolymers, polyimide, polycarbonate, modified polyphenylene ether, polybutylene terephthalate, polyarylate, polysulfone, polyphenylene sulfide, polyimide resins, fluororesins, polyamideimide, aramide resin, or polyetheretherketone), and thermosetting resins (for example, epoxy resins, urethane resins, urea resins, diallylphthalate resins, polyester resins, polycarbonate resins, silicon resins, polyacetal resins, nylon resins, furan resins, phenol resins, melamine resins, amino resins, and amide resins).

The carbonaceous precursor of the present invention is preferably a graphitizable carbon or a non-graphitizable carbon. Therefore, when a petroleum pitch or tar, a coal pitch or tar, or a thermoplastic resin is used as a carbon source, crosslinking (infusibilization) treatment such as oxidation may be performed, but a relatively low oxygen content (degree of oxygen crosslinking) is preferable. In addition, the carbonaceous material of the present invention may also be obtained without infusibilization. That is, the purpose of crosslinking treatment on the tar or pitch is to continuously control the structure of the tar or pitch which has been subjected to crosslinking treatment from a graphitizable carbon precursor to a non-graphitizable carbon precursor. Examples of the tar or pitch include petroleum tar or pitch produced as a by-product during ethylene production, coal tar produced during dry-distillation of coal, heavy components or pitch from which low-boiling-point components of coal tar are distilled out, or tar and pitch obtained by liquefaction of coal. Two or more of these types of tar and pitch may also be mixed together and used.

Infusibilization Treatment

Examples of methods of crosslinking treatment of a petroleum pitch or tar, a coal pitch or tar, a thermoplastic resin, or the like include a method of using a crosslinking agent or a method of treating the tar, pitch, or the like with an oxidizer such as air.

When a crosslinking agent is used, a carbon precursor is obtained by adding a crosslinking agent to the petroleum pitch or tar or the coal pitch or tar and mixing the substances while heating so as to promote crosslinking reactions. For example, a polyfunctional vinyl monomer, with which crosslinking reactions are promoted by radical reactions, such as divinylbenzene, trivinylbenzene, diallyl phthalate, ethylene glycol dimethacrylate, or N,N-methylene bis-acrylamide may be used as a crosslinking agent. Crosslinking reactions caused by the polyfunctional vinyl monomer are initiated by adding a radical initiator. Here, α,α'-azobis-isobutyronitrile (AIBN), benzoyl peroxide (BPO), lauroyl peroxide, cumene hydroperoxide, dicumyl peroxide, 1-butyl hydroperoxide, hydrogen peroxide, or the like can be used as a radical initiator.

In addition, when crosslinking reactions are promoted by treating the material with an oxidizer such as air, it is preferable to obtain the carbon precursor with the following method. Specifically, after a 2- or 3-ring aromatic compound with a boiling point of 200° C. or higher, or a mixture thereof is added to a petroleum or coal pitch or the like as an additive and mixed while heating, the mixture is formed to obtain a pitch compact. Next, after the additive is extracted and removed from the pitch compact with a solvent having low solubility with respect to the pitch and having high solubility with respect to the additive so as to form a porous pitch, the porous pitch is oxidized using an oxidizer to obtain a carbon precursor. The purpose of the aromatic additive described above is to make the compact porous by extracting and removing the additive from the pitch compact that has been formed so as to facilitate crosslinking treatment by means of oxidation and to make the carbonaceous material obtained after carbonization porous. Such an additive may be selected, for example, from one type of naphthalene, methyl naphthalene, phenyl naphthalene, benzyl naphthalene, methyl anthracene, phenanthrene, or biphenyl or a mixture of two or more types thereof. The added amount of the additive is preferably in the range from 30 to 70 parts by weight relative to 100 parts by weight of pitch. To achieve a homogeneous mixture of the pitch and the additive, they are mixed in the molten state while heating. The mixture of the pitch and the additive is preferably formed into particles with a particle size of 1 mm or less so that the additive can be easily extracted from the mixture. Formation may be performed in the molten state or may be performed by cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the compact of the mixture of pitch and additive using such a solvent, the additive can be removed from the compact while the shape of the compact is maintained. It is surmised that holes are formed by the additive in the compact at this time, and a pitch compact having uniform porosity can be obtained.

Furthermore, as a method for preparing a porous pitch compact other than the above method, the following method may be used. Petroleum or coal pitch or the like is pulverized to an average particle size (median diameter) of not greater than 60 μm. Thereafter, the fine powdered pitch, preferably fine powdered pitch having an average particle size (median diameter) of not less than 5 μm and not greater than 40 μm, is compression molded to form a porous compression molded compact. For compression molding, an existing molding machine may be used, specific examples of which include a single-action vertical molder, a continuous rotary molder, and a roll compression molder, but it is not limited thereto. The pressure during compression molding is preferably a surface pressure of 20 to 100 MPa or a linear pressure of 0.1 to 6 MN/m, and more preferably a surface pressure of 23 to 86 MPa or a linear pressure of 0.2 to 3 MN/m. The holding time of pressure during compression molding may be determined as appropriate according to the type of molding machine and the properties and treated quantity of the fine powdered pitch, but is generally in the range of 0.1 second to 1 minute. A binder may be compounded as necessary when the fine powdered pitch is molded by compression. Specific examples of the binder include water, starch, methylcellulose, polyethylene, polyvinyl alcohol, polyurethane, and phenol resin, but the binder is not necessarily limited thereto. The shape of the porous pitch compact obtained by compression molding may be particles, round cylinders, spheres, pellets, plates, honeycombs, blocks, Raschig rings, and the like, without particular limitation.

In order to crosslink the obtained porous pitch, the substance is then preferably oxidized using an oxidizer at a temperature of 120 to 400° C. An oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, when the softening point of the pitch or the like is low, the pitch melts at the time of oxidation, which makes oxidation difficult. Thus, the pitch or the like that is used preferably has a softening point of 150° C. or higher.

Infusibilization treatment may be performed when a petroleum pitch or tar, coal pitch or tar, or thermoplastic resin other than a porous pitch obtained with the method described above is used as a carbon precursor. That is, the method used for infusibilization treatment is not particularly limited, but infusibilization treatment may be performed using an oxidizer, for example. The oxidizer is also not particularly limited, but an oxidizing gas such as $O_2$, $O_3$, $SO_3$, $NO_2$, a mixed gas in which these are diluted with air, nitrogen, or the like, or air may be used as a gas. In addition, an oxidizing liquid such as sulfuric acid, nitric acid, or hydrogen peroxide or a mixture thereof can be used as a liquid. The oxidation temperature is also not particularly limited but is preferably from 120 to 400° C. When the temperature is lower than 120° C., a crosslinked structure cannot be formed sufficiently, and particles fuse to one another in the heat treatment step. When the temperature exceeds 400° C., decomposition reactions become more prominent than crosslinking reactions, and the yield of the resulting carbon material becomes low.

The carbonaceous precursor is not necessarily pulverized, but it may be pulverized in order to reduce the particle size. Pulverization may be performed before infusibilization, after infusibilization (before alkali impregnating), and/or after alkali impregnating. That is, the particle size may be adjusted to a particle size appropriate for infusibilization, a particle size appropriate for alkali impregnating, or a particle size appropriate for heat treatment. The pulverizer used for pulverization is not particularly limited, and a jet mill, a rod mill, a vibratory ball mill, or a hammer mill, for example, can be used.

As described above, the order of pulverization is not limited. However, in order to achieve a high charge/discharge capacity, which is the effect of the present invention, it is preferable to uniformly impregnate an alkali into the carbonaceous precursor and then perform heat treatment. Therefore, it is preferable to perform pulverization before alkali impregnating—specifically, it is preferable to perform the pulverization step, the alkali-impregnating step (1), the heat treatment step (2), and then the coating step (3) in this order. In order to achieve the particle size of the carbonaceous material that is ultimately obtained, it is preferable to pulverize the material to an average particle size of 1 to 50 μm in the pulverization step.

The average particle size of the carbonaceous precursor is not limited, but when the average particle size is too large, the impregnation of the alkali metal compound may be non-uniform, and a high charge/discharge capacity may not be achieved. Therefore, the upper limit of the average particle size of the carbonaceous precursor is preferably not greater than 600 μm, more preferably not greater than 100 μm, and even more preferably not greater than 50 μm. On the other hand, when the average particle size is too small, the specific surface area may increase, and the irreversible capacity may increase as a result. In addition, the scattering or the like of particles may increase. Therefore, the lower limit of the average particle size of the carbonaceous precursor is preferably not less than 1 μm, more preferably not less than 3 μm, and even more preferably not less than 5 μm.

Oxygen Content (Degree of Oxygen Crosslinking)

The oxygen content when the carbonaceous precursor is infusibilized by oxidation is not particularly limited as long as the effect of the present invention can be achieved. Note that in this specification, the oxygen contained in the carbonaceous precursor may be oxygen contained as a result of oxidation (infusibilization) or may be oxygen contained originally. However, in this specification, when the carbon precursor is infusibilized by oxidation, the oxygen atoms incorporated into the carbon precursor as a result of the oxidation reaction often play a role of crosslinking the molecules of the carbon precursor with one another, so the "degree of oxygen crosslinking" may be used with the same meaning as the "oxygen content". Here, when infusibilization treatment by oxygen crosslinking is not performed, the oxygen content (degree of oxygen crosslinking) may be 0 wt. %, but the lower limit of the oxygen content (degree of oxygen crosslinking) is preferably not less than 1 wt. %, more preferably not less than 2 wt. %, and even more preferably not less than 3 wt. %. When the content is less than 1 wt. %, the selective orientation of hexagonal network planes in the carbon precursor may become high, and the repetition characteristics may become poor. The upper limit of the oxygen content (degree of oxygen crosslinking) is preferably not greater than 20 wt. %, more preferably not greater than 15 wt. %, and even more preferably not greater than 12 wt. %. When the content exceeds 20 wt. %, pores for storing lithium may not be sufficiently formed.

As described in Examples 10 and 11, even when oxidation is not performed, a carbonaceous material exhibiting a high charge/discharge capacity can be obtained.

True Density of Carbon Precursor

Because the true density of a carbon material varies depending on the arrangement of the hexagonal network planes, the so-called fine composition, or crystal perfection, the true density of a carbonaceous material is an effective indicator of the structure of carbon. A carbonaceous material is obtained as a result of the heat treatment of a carbonaceous precursor, and the true density of a carbonaceous material varies together with the heat treatment temperature. Thus, the true density of a carbonaceous material obtained by treating a carbonaceous precursor at a specific treatment temperature is an effective indicator of the structure of the carbonaceous precursor.

The true density of the carbonaceous precursor is not particularly limited. However, the lower limit of the true density of the carbonaceous material when the carbonaceous precursor preferably used in the present invention is heat-treated for 1 hour at 1100° C. in a nitrogen gas atmosphere is preferably not less than 1.45 g/cm$^3$, more preferably not less than 1.50 g/cm$^3$, and even more preferably not less than 1.55 g/cm$^3$. The upper limit of the true density is preferably not greater than 2.20 g/cm$^3$, more preferably not greater than 2.10 g/cm$^3$, and even more preferably not greater than 2.05 g/cm$^3$. When the true density of a carbonaceous material obtained by heat-treating a carbonaceous precursor for 1 hour at 1100° C. in a nitrogen gas atmosphere is from 1.45 to 2.20 g/cm$^3$, the true density of the resulting carbonaceous material can be controlled to 1.20 to 1.60 g/cm$^3$.

Elemental Alkali Metal or Compound Containing Elemental Alkali Metal

An elemental alkali metal such as lithium, sodium, or potassium may be used as the elemental alkali metal contained in the alkali metal compound with which the carbonaceous precursor is impregnated. Lithium compounds have a lower space-expanding effect than those of other alkali metal compounds and also have a problem that the amount of reserves is lower than those of other elemental alkali metals. On the other hand, although metallic potassium is produced when heat treatment is performed on potassium compounds in a reducing atmosphere in the presence of carbon, metallic potassium have higher reactivity with water content than those of other elemental alkali metals, which results in a problem that the risk is particularly high. From such perspectives, sodium is preferable as an elemental alkali metal. By using sodium, it is possible to obtain a carbonaceous material which exhibits a particularly high charge/discharge capacity.

The elemental alkali metal may be impregnated into the carbonaceous precursor in the metal state, but it may also be impregnated as a compound containing an elemental alkali metal such as a hydroxide, a carbonate, a hydrogencarbonate, or a halogen compound (also called an alkali metal compound or an alkali compound hereafter). The alkali metal compound is not particularly limited, but a hydroxide or carbonate is preferable in that the permeability is high and that the carbonaceous precursor can be impregnated uniformly, and a hydroxide is particularly preferable.

Alkali-Impregnated Carbonaceous Precursor

By adding an elemental alkali metal or an alkali metal compound to the carbonaceous precursor described above, an alkali-impregnated carbonaceous precursor can be obtained. The method for adding an elemental alkali metal or an alkali metal compound is not particularly limited. For example, a prescribed amount of an elemental alkali metal or an alkali metal compound may be mixed with a carbonaceous precursor in a powder state. In addition, an alkali metal compound may be dissolved in an appropriate solvent to prepare an alkali metal compound solution. After this alkali metal compound solution is mixed with the carbonaceous precursor, the solvent may be volatilized to prepare a carbonaceous precursor impregnated with an alkali metal compound. Specifically, although not particularly limited, an alkali metal hydroxide such as sodium hydroxide may be dissolved in water, which is a good solvent, to form an aqueous solution, and this may be added to the carbonaceous precursor. After the resultant is heated to 50° C. or higher, the water content may be removed at atmospheric pressure or reduced pressure so as to add the alkali metal compound to the carbonaceous precursor. Carbon precursors are often hydrophobic, and when the affinity of the alkali aqueous solution is low, the affinity of the alkali aqueous solution with the carbonaceous precursor can be improved by adding an alcohol as appropriate. When an alkali metal hydroxide is used and impregnated in air, the alkali metal hydroxide absorbs carbon dioxide so that the alkali metal hydroxide transforms into a carbonate of an alkali metal compound, and the penetration force of the alkali metal compound into the carbonaceous precursor decreases, so it is preferable to reduce the carbon dioxide concentration in the atmosphere. The water content should be removed to a degree that enables the fluidity of the alkali-impregnated carbon precursor to be maintained.

The amount of the alkali metal compound to be added to the carbonaceous precursor is not particularly limited, but the upper limit of the added amount is preferably not greater than 70.0 wt. %, more preferably not greater than 60.0 wt. %, and even more preferably not greater than 50.0 wt. %. When the added amount of the elemental alkali metal or the alkali metal compound is too large, excessive alkali activation occurs. Therefore, the specific surface area increases, and this causes the irreversible capacity to increase, which is not preferable. In addition, the lower limit of the added amount is not particularly limited but is preferably not less than 5.0 wt. %, more preferably not less than 10.0 wt. %, and even more preferably not less than 15.0 wt. %. When the added amount of the alkali metal compound is too small, it becomes difficult to form a porous structure for doping and de-doping, which is not preferable.

When an alkali metal compound is dissolved or dispersed in an aqueous solution or an appropriate solvent and impregnated into the carbonaceous precursor, and the solvent such as water is then volatilized and dried, the alkali-impregnated carbonaceous precursor may agglomerate and solidify. If an alkali-impregnated carbonaceous precursor in a solid state is subjected to pre-heat treatment or main heat treatment, it is not possible to sufficiently discharge a degradation gas or the like generated at the time of heat treatment, which has an adverse effect on performance. Therefore, when the alkali-impregnated carbonaceous precursor is a solid material, it is preferable to perform pre-heat treatment and/or main heat treatment after cracking of the alkali-impregnated carbonaceous precursor.

Heat Treatment Step (2)

The heat treatment step includes (a) performing main heat treatment on the alkali-impregnated carbonaceous precursor at 800° C. to 1500° C. in a non-oxidizing gas atmosphere or (b) performing pre-heat treatment on the alkali-impregnated carbonaceous precursor at a temperature of not lower than 400° C. and lower than 800° C. in a non-oxidizing gas atmosphere and then performing main heat treatment at 800° C. to 1500° C. in a non-oxidizing gas atmosphere. In the heat treatment step for obtaining the carbonaceous material for a non-aqueous electrolyte secondary battery anode according to the present invention, pre-heat treatment may be performed first and main heat treatment may then be performed in accordance with the operation of (b) described above, or main heat treatment may be performed without performing pre-heat treatment in accordance with the operation of (a) described above.

Pre-Heat Treatment

Pre-heat treatment can remove volatile content such as $CO_2$, CO, $CH_4$, and $H_2$ as well as tar content. In addition, when the alkali-impregnated carbonaceous precursor is heat-treated directly at a high temperature, large amounts of decomposition products are generated from the alkali-impregnated carbonaceous precursor. These decomposition products cause secondary decomposition reactions at high temperatures and may adhere to the surface of the carbon material, which may cause a decrease in battery performance, and the decomposition products may adhere to the inside of the heat treatment furnace, which may cause the blockage of the furnace. Accordingly, it is preferable to perform pre-heat treatment prior to main heat treatment so as to reduce decomposition products at the time of main heat treatment. When the pre-heat treatment temperature is too low, the removal of decomposition products may be insufficient. On the other hand, when the pre-heat treatment temperature is too high, the decomposition products may cause reactions such as secondary decomposition reactions.

The pre-heat treatment temperature is preferably not lower than 400° C. and lower than 800° C. and is more preferably not lower than 500° C. and lower than 800° C. When the pre-heat treatment temperature is lower than 400° C., the removal of tar becomes insufficient, and the amount of tar or gas generated in the main heat treatment step after pulverization becomes large. This may adhere to the particle surface and cause a decrease in battery performance without being capable of maintaining the surface properties after pulverization. On the other hand, when the pre-heat treatment temperature is 800° C. or higher, the temperature exceeds the tar-generating temperature range, and the used energy efficiency decreases. Furthermore, the generated tar causes a secondary decomposition reaction, and the tar adheres to the carbon precursor and causes a decrease in performance.

Pre-heat treatment is performed in a non-oxidizing gas atmosphere, and examples of non-oxidizing gases include helium, nitrogen, and argon. In addition, pre-heat treatment can be performed under reduced pressure, for example, at a pressure of 10 kPa or less. The pre-heat treatment time is not particularly limited, but pre-heat treatment may be performed for 0.5 to 10 hours, for example, and preferably performed for 1 to 5 hours.

Pulverization

The elemental alkali metal or the alkali metal compound is preferably impregnated into a carbonaceous precursor having a small particle size since the added amount of the elemental alkali metal or the alkali metal compound is uniform and permeation into the carbonaceous precursor is easy. Therefore, the carbonaceous precursor is preferably pulverized prior to pre-heat treatment. However, since the carbonaceous precursor may be melted at the time of pre-heat treatment, the particle size may be adjusted by pulverizing the carbonaceous precursor in advance after pre-heat treatment on the carbonaceous precursor. In addition, as described above, when the elemental alkali metal or the alkali metal compound is dissolved or dispersed in an aqueous solution or an appropriate solvent and added to the carbonaceous precursor, and the solvent such as water is then volatilized and dried, the pulverized alkali-impregnated carbonaceous precursor may agglomerate and solidify. Therefore, when the alkali-impregnated carbonaceous precursor is a solid material, it is preferable to pulverize the alkali-impregnated carbonaceous precursor. Pulverization may also be performed after carbonization (after main heat treatment), but when the carbonization reaction progresses, the carbon precursor becomes hard, which makes it difficult to control the particle size distribution by means of pulverization. Therefore, the pulverization step is preferably performed after pre-heat treatment at a temperature of 800° C. or lower and before the main heat treatment. The average particle size of the carbonaceous material of the present invention can be set to 1 to 50 μm by pulverization. The pulverizer used for pulverization is not particularly limited, and a jet mill, a rod mill, a vibratory ball mill, or a hammer mill, for example, can be used, but a jet mill equipped with a classifier is preferable.

Washing Alkali Metals and Alkali Metal Compounds

In the heat treatment step (2) of the present invention, alkali metals and alkali metal compounds are preferably removed (washing of the alkali compound). When alkali metals and alkali metal compounds remain in large amounts in the carbonaceous material, the carbonaceous material becomes strongly alkaline. For example, when an anode using a PVDF (polyvinylidene fluoride) is produced as a binder, the PVDF may be gelified if the carbonaceous material is strongly alkaline. In addition, when alkali metals remain in the carbonaceous material, the alkali metals may transition to the opposite pole at the time of the discharge of the secondary battery, which may have an adverse effect on the charge/discharge characteristics. Therefore, it is preferable to remove the alkali metal compounds from the carbonaceous precursor.

That is, the washing (decalcification) of alkali metals and alkali metal compounds is performed in order to prevent the alkali metal compounds from remaining in the carbonaceous material. When the added amount of the elemental alkali metal or the like is small, the residual amount of the alkali metal becomes small, but the lithium doping/de-doping capacity tends to decrease. In addition, when the heat treatment temperature is high, the alkali metal is volatilized and the residual amount becomes small, whereas when the heat treatment temperature is high, the pores for storing lithium become small, and the lithium doping/de-doping capacity decreases, which is not preferable. Therefore, when the added amount of the elemental alkali metal or the like is small and when the heat treatment temperature is low, it is preferable to wash the alkali compound to reduce the residual amount of the alkali metal.

The washing of the alkali compound is not particularly limited but may be performed before or after main heat treatment. Therefore, the heat treatment step (2)(a) may be (2) a heat treatment step of (a1) performing main heat treatment on the alkali-impregnated carbonaceous precursor at 800° C. to 1500° C. in a non-oxidizing gas atmosphere and then removing alkali metals and compounds containing elemental alkali metals by washing. In addition, the heat treatment step (2)(b) may be (2) a heat treatment step of (b1) performing pre-heat treatment on the alkali-impregnated carbonaceous precursor at a temperature of not lower than 400° C. and lower than 800° C. in a non-oxidizing gas atmosphere, removing alkali metals and compounds containing elemental alkali metals by washing, and then performing main heat treatment at 800° C. to 1500° C. in a non-oxidizing gas atmosphere, or (b2) performing pre-heat treatment at a temperature of not lower than 400° C. and lower than 800° C. in a non-oxidizing gas atmosphere, performing main heat treatment at 800° C. to 1500° C. in a non-oxidizing gas atmosphere, and then removing alkali metals and compounds containing elemental alkali metals by washing.

The removal of alkali metals and alkali compounds can be performed in accordance with an ordinary method. Specifically, alkali metals and alkali compounds can be removed with a gas phase or a liquid phase. In the case of a gas phase, elemental alkali metals or alkali metal compounds are removed by volatilization at a high temperature. In the case of a liquid phase, alkali metals and alkali compounds are removed as follows.

In order to remove alkali metals and alkali metal compounds from the carbonaceous precursor by washing, it is preferable to first pulverize the alkali-impregnated carbonaceous precursor into fine particles and to then treat the fine particles by immersing them in water or an acid such as hydrochloric acid. That is, acid washing or water washing is preferable, and water washing entailing treatment by immersion in water is particularly preferable. The acid or water at room temperature may be used, but a heated substance (for example, hot water) may also be used. When the particle size of the product to be treated at the time of alkali compound washing is large, the washing rate may decrease. The average particle size of the product to be treated is preferably not greater than 100 µm and more preferably not greater than 50 µm. Alkali compound washing is not particularly limited, but performing alkali compound washing on the carbon precursor obtained by pre-heat treatment is advantageous for increasing the washing rate.

Alkali compound washing may also be performed by immersing the product to be treated in water or an acid such as hydrochloric acid so as to extract or remove elemental alkali metals or alkali metal compounds. In immersion treatment for performing alkali compound washing, repeatedly performing immersion treatments for short periods of time is more effective than performing one immersion treatment for a long period of time from the perspective of enhancing the washing rate. In alkali compound washing, immersion treatment with water may be performed two or more times after immersion treatment with an acid is performed.

Main Heat Treatment

Main heat treatment in the production method of the present invention can be performed in accordance with an ordinary main heat treatment procedure, and a carbonaceous material for a non-aqueous electrolyte secondary battery anode can be obtained by performing main heat treatment. The temperature of main heat treatment is from 800 to 1500° C. The lower limit of the heat treatment temperature in the present invention is not lower than 800° C., more preferably not lower than 1100° C., and particularly preferably not lower than 1150° C. When the heat treatment temperature is too low, carbonization may be insufficient, and the irreversible capacity may increase. In addition, making the heat treatment temperature high enables the removal of volatile alkali metals from the carbonaceous material. That is, a large amount of functional groups remain in the carbonaceous material, the value of H/C increases, and the irreversible capacity also increases due to a reaction with lithium. The upper limit of the main heat treatment temperature in the present invention is not higher than 1500° C., more preferably not higher than 1400° C., and particularly not higher than 1300° C. When the main heat treatment temperature exceeds 1500° C., the pores formed as lithium storage sites may be reduced, and the doping and de-doping capacity may decrease. That is, the selective orientation of carbon hexagonal planes may become high, and the discharge capacity may decrease.

Main heat treatment is preferably performed in a non-oxidizing gas atmosphere. Examples of the non-oxidizing gases include helium, nitrogen, and argon, and these may be used alone or as a mixture. Furthermore, main heat treatment can be performed under reduced pressure, for example, at a pressure of not greater than 10 kPa. The main heat treatment time is not particularly limited, but main heat treatment can be performed for 0.1 to 10 hours, for example, and is preferably performed for 0.3 to 8 hours, and more preferably for 0.4 to 6 hours.

Coating Step (3)

The production method of the present invention includes a step of coating the heat-treated product with pyrolytic carbon. Coating with pyrolytic carbon may be performed using the CVD method described in Patent Document 7, for example. Specifically, a heat-treated product is brought into contact with a straight-chain or cyclic hydrocarbon gas, and carbon that has been purified by thermolysis is vapor-deposited onto the heat-treated product. This method is well known as the so-called chemical vapor deposition method (CVD method). The specific surface area of the obtained carbonaceous material can be controlled by the coating step using pyrolytic carbon.

The pyrolytic carbon used in the present invention is not limited as long as it can be added as a hydrocarbon gas and can reduce the specific surface area of the carbonaceous material. The hydrocarbon gas is preferably mixed with a non-oxidizing gas and brought into contact with the carbonaceous material.

The number of carbon atoms of the hydrocarbon gas is not limited but is preferably from 1 to 25, more preferably from 1 to 20, even more preferably from 1 to 15, and most preferably from 1 to 10.

The carbon source of the hydrocarbon gas is also not limited, but examples include methane, ethane, propane, butane, pentane, hexane, octane, nonane, decane, ethylene, propylene, butene, pentene, hexene, acetylene, cyclopentane, cyclohexane, cycloheptane, cyclooctane, cyclononane, cyclopropene, cyclopentene, cyclohexene, cycloheptene, cyclooctene, decalin, norbornene, methylcyclohexane, norbornadiene, benzene, toluene, xylene, mesitylene, cumene, butylbenzene, and styrene. In addition, a hydrocarbon gas produced by heating a gaseous organic substance and a solid or liquid organic substance may also be used as a carbon source for the hydrocarbon gas.

The contact temperature is not limited but is preferably from 600 to 1000° C., more preferably from 650 to 1000° C., and even more preferably from 700 to 950° C.

The contact time is also not particularly limited, but is preferably from 10 minutes to 5.0 hours and more preferably from 15 minutes to 3 hours. However, the preferable contact time differs depending on the carbonaceous material to be coated, and the specific surface area of the obtained carbonaceous material can basically be reduced as the contact time becomes longer. That is, the coating step is preferably performed under conditions in which the specific surface area of the obtained carbonaceous material is not greater than 30 $m^2/g$.

In addition, the device used for coating is not limited, but coating may be performed, for example, with a continuous or batch in-layer circulation method using a fluidized reactor. The amount of gas supplied (circulated amount) is also not limited.

Nitrogen or argon may be used as a non-oxidizing gas. The amount of the hydrocarbon gas added to the non-oxidizing gas is preferably from 0.1 to 50 vol. %, more preferably from 0.5 to 25 vol. %, and even more preferably from 1 to 15 vol. %.

Reheating Treatment Step (4)

The production method of the present invention preferably includes a reheating treatment step (4). This reheating treatment step is a step for carbonizing the pyrolytic carbon coated on the surface in the heat treatment step (3).

The temperature in the reheating treatment step is, for example, from 800 to 1500° C. The lower limit of the temperature in the reheating treatment step is not lower than 800° C., more preferably not lower than 1000° C., and particularly preferably not lower than 1050° C. The upper limit of the temperature in the reheating treatment step is not higher than 1500° C., more preferably not higher than 1400° C., and particularly preferably not higher than 1300° C.

The reheating treatment step is preferably performed in a non-oxidizing gas atmosphere. Examples of non-oxidizing gases include helium, nitrogen, and argon, and these may be used alone or as a mixture. Main heat treatment may also be performed in a gas atmosphere in which a halogen gas such as chlorine is mixed with the non-oxidizing gas described above. In addition, reheating treatment can be performed under reduced pressure, for example, at a pressure of 10 kPa or lower. The reheating treatment time is not particularly limited, but reheating treatment can be performed for 0.1 to 10 hours, for example, and is preferably performed for 0.3 to 8 hours, and more preferably for 0.4 to 6 hours.

Operation

In the present invention, by adding a compound containing an elemental alkali metal to the carbonaceous precursor and performing heat treatment, it is possible to form pores for storing lithium in the carbonaceous material as a result of a carbonization reaction and an alkali activation reaction with the carbonaceous precursor. A carbonaceous material having large pores can be prepared by using high concentrations in the structure of the carbonaceous material and the compound containing an elemental alkali metal. However, as the pores become larger, the specific surface area increases, which causes reactions such as the degradation of the electrolyte solution at the time of doping/de-doping and increases the irreversible capacity, resulting in pores that are not suited to lithium storage. The present inventors conducted dedicated research based on the concept that if lithium could be stored in large pores formed by an alkali activation reaction, a carbonaceous material having an extremely high doping/de-doping capacity could be obtained. The present inventors discovered that by coating the surface of a carbonaceous material having large pores formed by an alkali activation reaction with pyrolytic carbon, the specific surface area decreases dramatically, which makes it possible to reduce the irreversible capacity, and thus such large pores are suitable for storing lithium.

[2] Carbonaceous Material for Non-Aqueous Electrolyte Secondary Battery Anode

The carbonaceous material for non-aqueous electrolyte secondary battery anode of the present invention can be produced by the method of producing a carbonaceous material for non-aqueous electrolyte secondary battery anode. The physical properties of the carbonaceous material for a non-aqueous electrolyte secondary battery anode according to the present invention are not particularly limited, but the true density is from 1.20 to 1.60 $g/cm^3$, the specific surface area determined by a BET method using nitrogen adsorption is not greater than 30 $m^2/g$, the average particle size is not greater than 50 μm, and the atom ratio (H/C) of hydrogen atoms to carbon atoms determined by elemental analysis is not greater than 0.1.

True Density

The true density of a graphitic material having an ideal structure is 2.27 $g/cm^3$, and the true density tends to decrease as the crystal structure becomes disordered. Accordingly, the true density can be used as an index expressing a carbon structure. The true density described herein was measured using a butanol method.

The true density of the carbonaceous material of the present invention is from 1.20 to 1.60 $g/cm^3$. The upper limit of the true density is preferably not greater than 1.55 $g/cm^3$, more preferably not greater than 1.50 $g/cm^3$, even more preferably not greater than 1.48 $g/cm^3$, and most preferably not greater than 1.45 $g/cm^3$. The lower limit of the true density is preferably not less than 1.25 $g/cm^3$ and more preferably not less than 1.30 $g/cm^3$. A carbonaceous material having a true density exceeding 1.60 $g/cm^3$ may have a small number of pores having a size capable of storing lithium, and the doping and de-doping capacity may decrease. In addition, an increase in true density involve the selective orientation of the carbon hexagonal plane, so the carbonaceous material often expands and contracts at the time of lithium doping and de-doping, which is not preferable. On the other hand, in the case of a carbonaceous material having a true density of less than 1.20 $g/cm^3$, the electrolyte solution permeates the pores, and such a carbonaceous material cannot maintain a stable structure for lithium storage sites. Furthermore, the electrode density decreases and thus causes a decrease in the volume energy density.

Specific Surface Area

The specific surface area may be determined with an approximation equation derived from a BET equation based on nitrogen adsorption. The specific surface area of the carbonaceous material of the present invention is not greater than 30 m$^2$/g. When the specific surface area exceeds 30 m$^2$/g, reactions with the electrolyte solution increase, which may lead to an increase in irreversible capacity and therefore a decrease in battery performance. The upper limit of the specific surface area is preferably not greater than 30 m$^2$/g, more preferably not greater than 20 m$^2$/g, and even more preferably not greater than 10 m$^2$/g. In addition, the lower limit of the specific surface area is not particularly limited, but when the specific surface area is less than 0.5 m$^2$/g, the input/output characteristics may be diminished, so the lower limit of the specific surface area is preferably not less than 0.5 m$^2$/g.

Average Particle Size ($D_{v50}$)

The average particle size ($D_{v50}$) of the carbonaceous material of the present invention is from 1 to 50 μm. The lower limit of the average particle size is preferably not less than 1 μm, more preferably not less than 1.5 μm and particularly preferably not less than 2.0 μm. When the average particle size is less than 1 μm, the specific surface area increases due to an increase in fine powder. Therefore, the reactivity with an electrolyte solution increases, and the irreversible capacity, which is the capacity that is charged but not discharged, also increases, and the proportion of the cathode capacity that is wasted thus increases, which is not preferable. The upper limit of the average particle size is preferably not greater than 40 μm and more preferably not greater than 35 μm. When the average particle size exceeds 50 μm, the diffusion free path of lithium within particles increases. This makes rapid charging and discharging difficult. Furthermore, in the case of a secondary battery, increasing the electrode area is important for improving the input/output characteristics. Thus, it is necessary to reduce the coating thickness of the active material on the current collector at the time of electrode preparation. In order to reduce the coating thickness, it is necessary to reduce the particle size of the active material. From this perspective, the upper limit of the average particle size is preferably not greater than 50 μm.

Atom Ratio (H/C) of Hydrogen Atoms to Carbon Atoms

The H/C ratio is determined by measuring hydrogen atoms and carbon atoms by elemental analysis. Since the hydrogen content of the carbonaceous material decreases as the degree of carbonization increases, the H/C ratio tends to decrease. Accordingly, the H/C ratio is effective as an index expressing the degree of carbonization. The H/C ratio of the carbonaceous material of the present invention is not greater than 0.1 and preferably not greater than 0.08. The H/C ratio is particularly preferably not greater than 0.05. When the H/C ratio of hydrogen atoms to carbon atoms exceeds 0.1, the amount of functional groups present in the carbonaceous material increases, and the irreversible capacity increases due to a reaction with lithium.

Elemental Alkali Metal Content

The elemental alkali metal content of the carbonaceous material of the present invention is not particularly limited but is preferably from 0.05 to 5 wt. %. The lower limit of the elemental alkali metal content is preferably 0.5 wt. %, and the upper limit is preferably not greater than 4 wt. %, even more preferably 3 wt. %, and most preferably not greater than 1.5 wt. %. When the elemental alkali metal content is too high, the carbonaceous material becomes strongly alkaline, which may cause the gelification of the PVDF used as a binder and cause an adverse effect on the charge/discharge characteristics. Therefore, the content is preferably set to 0.05 to 5 wt. % by removing the added alkali by washing the alkali metal compound.

The elemental alkali metal content can be measured with the following method. A carbon sample containing prescribed elemental alkali metals is prepared in advance, and a calibration curve expressing the relationship between the X-ray intensity corresponding to each elemental alkali metal and the content of the elemental alkali metal is created using an X-ray fluorescence spectrometer. Next, the X-ray intensity corresponding to the elemental alkali metal in X-ray fluorescence analysis is measured, and the content of each elemental alkali metal is determined from the calibration curve created above. X-ray fluorescence analysis is performed under the following conditions using an X-ray fluorescence spectrometer manufactured by Rigaku Corporation. A holder for irradiating from upper part is used, and the measured area of the sample is within a circumferential line having the diameter of 20 mm. The measurement sample is mounted, and a measurement is performed after the surface is covered with a polyethylene terephthalate film.

The elemental alkali metal content of the carbonaceous materials of Examples 1 to 19 was not greater than 1.5 wt. %.

[3] Anode for a Non-Aqueous Electrolyte Secondary Battery

Production of Anode

An anode that includes the carbonaceous material of the present invention can be produced by adding a binder to the carbonaceous material, adding an appropriate amount of suitable solvent, kneading to form an electrode mixture, subsequently, coating the electrode mixture on a collector formed from a metal plate or the like and drying, and then pressure-forming. An electrode having high electrical conductivity can be produced by using the carbonaceous material of the present invention without particularly adding a conductive agent, but a conductive agent may be added as necessary when the electrode mixture is prepared for the purpose of imparting even higher electrical conductivity. As the conductive agent, acetylene black, Ketjen black, carbon nanofibers, carbon nanotubes, carbon fibers, or the like can be used. The added amount of the conductive agent varies depending on the type of the conductive agent that is used. When the added amount is too small, the expected electrical conductivity cannot be achieved, which is not preferable. Conversely, when the added amount is too large, dispersion of the conductive agent in the electrode mixture becomes poor, which is not preferable. From this perspective, the proportion of the added amount of the conductive agent is preferably from 0.5 to 15 wt. % (here, it is assumed that the amount of the active material (carbonaceous material)+the amount of the binder+the amount of the conductive agent=100 wt. %), more preferably from 0.5 to 7 wt. %, and particularly preferably from 0.5 to 5 wt. %. The binder is not particularly limited as long as the binder does not react with an electrolyte solution such as polyvinylidene fluoride (PVDF), polytetrafluoroethylene, and a mixture of styrene-butadiene rubber (SBR) and carboxymethyl cellulose (CMC). Of these, PVDF is preferable since the PVDF attached on the surface of an active material does not inhibit migration of lithium-ions and excellent input/output characteristics is achieved. In order to form a slurry by dissolving PVDF, a polar solvent such as N-methylpyrrolidone (NMP) can be preferably used; however, an aqueous emulsion, such as SBR, or CMC can be also used by dissolving in water. When the added amount of the binder is too large, since the resistance of the resulting electrode becomes large, the internal resistance of the battery becomes large. This diminishes the battery characteristics, which is not preferable. When the added amount of the binder is too small, the bonds between the anode material particles, and the bonds between the anode material particles and the current collector become insufficient, which is not preferable. A preferable amount of the binder that is added varies depending on the type of the binder that is used; however, the amount of binder is, when a PVDF-based binder is used, preferably from 3 to 13 wt. %, and more preferably from 3 to 10 wt. %. On the other hand, in the case of a binder including water as a solvent, a plurality of binders such as a mixture of SBR and CMC are often used in combination. The total amount of all of the binders that are used is preferably from 0.5 to 5 wt. % and more preferably from 1 to 4 wt. %. The electrode active material layer is typically formed on both sides of the current collector, but the layer may be formed on one side as necessary. The number of required current collectors or separators becomes smaller as the thickness of the electrode active material layer increases, which is preferable for increasing capacity. However, it is more advantageous for the electrode area of opposite electrodes to be wider from the perspective of improving the input/output characteristics. Therefore, when the active material layer is too thick, the input/output characteristics are diminished, which is not preferable. The thickness of a preferable active material layer (per side) is not limited and is within the range of from 10 μm to 1000 μm, but the thickness is preferably from 10 to 80 μm, more preferably from 20 to 75 μm, and particularly preferably from 20 to 60 μm.

An anode ordinarily has a current collector. Steel use stainless (SUS), copper, nickel, or carbon, for example, can be used as an anode current collector, but of these, copper or SUS is preferable.

[4] Non-Aqueous Electrolyte Secondary Battery

When an anode for a non-aqueous electrolyte secondary battery is formed using the anode material of the present invention, the other materials constituting a battery such as a cathode material, a separator, and an electrolyte solution are not particularly limited, and various materials that have been conventionally used or proposed for non-aqueous solvent secondary batteries can be used.

Cathode

The cathode contains a cathode active material and may further contain a conductive agent and/or a binder. The mixing ratio of the cathode active material and other materials in the cathode active material layer is not limited and may be determined appropriately as long as the effect of the present invention can be achieved.

The cathode active material can be used without limiting the cathode active material. For example, layered oxide-based complex metal chalcogen compounds (as represented by $LiMO_2$, where M is a metal such as $LiCoO_2$, $LiNiO_2$, $LiMnO_2$, or $LiNi_xCo_yMn_zO_2$ (where x, y, and z represent composition ratios)), olivine-based complex metal chalcogen compounds (as represented by $LiMPO_4$, where M is a metal such as $LiFePO_4$), and spinel-based complex metal chalcogen compounds (as represented by $LiM_2O_4$, where M is a metal such as $LiMn_2O_4$) are preferable, and these chalcogen compounds may be mixed as necessary.

In addition, ternary [Li(Ni—Mn—Co)$O_2$] materials in which the material stability is enhanced by replacing some of the cobalt of lithium cobaltate with nickel and manganese and using the three components of cobalt, nickel, and manganese, and NCA-based materials [Li(Ni—Co—Al)$O_2$] in which aluminum is used instead of manganese in the ternary materials described above are known, and these materials may be used.

The cathode may further contain a conductive agent and/or a binder. Examples of conductive agents include acetylene black, Ketjen black, and carbon fibers. The content of the conductive agent is not limited but may be from 0.5 to 15 wt. %, for example. An example of a binder is a fluorine-containing binder such as PTFE or PVDF. The content of the conductive agent is not limited but may be from 0.5 to 15 wt. %, for example. The thickness of the cathode active material layer is not limited but is within the range of from 10 μm to 1000 μm, for example. The cathode active material layer ordinarily has a current collector. SUS, aluminum, nickel, iron, titanium, and carbon, for example, can be used as an anode current collector, and of these, aluminum or SUS is preferable.

Electrolyte Solution

A non-aqueous electrolyte solution used with this cathode and anode combination is typically formed by dissolving an electrolyte in a non-aqueous solvent. One type or two or more types of organic solvents such as propylene carbonate, ethylene carbonate, dimethyl carbonate, diethyl carbonate, dimethoxyethane, diethoxyethane, γ-butyl lactone, tetrahydrofuran, 2-methyl tetrahydrofuran, sulfolane, or 1,3-dioxolane may be used in combination as a non-aqueous solvent. Furthermore, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ and the like can be used as an electrolyte. The secondary battery is typically formed by immersing, in an electrolyte solution, a cathode layer and an anode layer, which are produced as described above. In the secondary battery, the electrodes are arranged facing each other via, as necessary, a liquid permeable separator formed from nonwoven fabric and other porous materials. A liquid permeable separator formed from nonwoven fabric and other porous materials that is typically used in secondary batteries can be used as a separator. Alternatively, a solid electrolyte formed from polymer gel into which an electrolyte solution is impregnated can be also used in place of a separator or together with a separator.

Optimal Structure of Anode Material

Firstly, a optimal structure of an anode material for a non-aqueous electrolyte secondary battery is a structure having pores which allow the doping and de-doping of the anode material with a large amount of lithium. The pores of the carbonaceous material have a porous structure having a wide pore size, but because pores that can be permeated by an electrolyte solution are not considered an outer surface electrochemically, the pores do not serve as stable pores for storing lithium. The sites for storing lithium are pores which are difficult for an electrolyte solution to permeate, wherein lithium reaches every corner of the pores at the time of lithium doping. For the expression "lithium reach every corner of the pores", lithium is obviously dispersed over the carbon skeleton, but during this process, the pores may also allow lithium to be dispersed to the inside of carbon while the carbon hexagonal planes are widened.

Secondly, a second optimum structure of an anode material for a non-aqueous electrolyte secondary battery is a structure which makes it possible to reduce the irreversible capacity, which is the difference between the doping capacity and de-doping capacity measured at the beginning of the doping and de-doping reactions—that is, a structure in which there are few degradation reactions of the electrolyte solution on the carbon surface. It is known that graphitic materials degrade electrolyte solutions, so a non-graphitic material is preferable as a carbon skeleton. In addition, it is known that the edge faces have high reactivity in the carbonaceous material, so it is preferable to suppress the production of edge faces in the pore structure formation process.

The anode material for a non-aqueous electrolyte secondary battery according to the present invention is obtained by heat treatment an alkali-impregnated carbonaceous precursor and then performing heat treatment on the heat-treated product in a non-oxidizing gas atmosphere containing a hydrocarbon compound having from 1 to 20 carbon atoms. The anode material for a non-aqueous electrolyte secondary battery according to the present invention has a structure having pores which allow the doping and de-doping of the anode material with a large amount of lithium and having few degradation reactions of the electrolyte solution on the carbon surface.

EXAMPLES

The present invention will be described in detail hereafter using examples, but these examples do not limit the scope of the present invention.

The measurement methods for the physical property values of the carbonaceous precursor ("atom ratio (H/C) of hydrogen/carbon", "oxygen content", and "true density") and the physical property values of the carbonaceous material for a non-aqueous electrolyte secondary battery of the present invention ("atom ratio (H/C) of hydrogen/carbon", "true density determined by a butanol method", and "average particle size according to laser diffraction") will be described hereinafter. The physical property values described herein, including those of the examples, are based on values determined by the following methods.

Atom Ratio (H/C) of Hydrogen/Carbon

The atom ratio was measured in accordance with the method stipulated in JIS M8819. The ratio of the numbers of hydrogen/carbon atoms was determined from the mass ratio of hydrogen to carbon in a sample obtained by elemental analysis using a CHN analyzer.

Oxygen Content

The oxygen content was measured in accordance with the method stipulated in JIS M8819. The mass percentage of carbon, hydrogen, and nitrogen in a sample obtained by elemental analysis using a CHN analyzer was subtracted from 100, and this was used as the oxygen content.

Specific Surface Area

The specific surface area was measured in accordance with the method stipulated in JIS Z8830. A summary is given below.

Approximation equation derived from a BET equation:

$$v_m = 1/(v(1-x))$$ (Equation 1)

A value $v_m$ was determined by a one-point method (relative pressure x=0.2) based on nitrogen adsorption at the temperature of liquid nitrogen using the above approximation equation derived from a BET equation, and the specific surface area of the sample was calculated from the following equation: specific surface area=$4.35 \times v_m$ (m²/g).
(where, $v_m$ is the amount of adsorption (cm³/g) required to form a monomolecular layer on the sample surface; v is the amount of adsorption (cm³/g) actually measured, and x is the relative pressure). Specifically, the amount of adsorption of nitrogen in the carbonaceous material at the temperature of liquid nitrogen was measured as follows using a "Flow Sorb II 2300" manufactured by Micromeritics Instrument Corporation.

A test tube was filled with the carbonaceous material, and the test tube was cooled to −196° C. while infusing helium gas containing nitrogen gas at a concentration of 20 mol % so that the nitrogen was adsorbed in the carbonaceous material. The test tube was returned to room temperature. The amount of nitrogen desorbed from the sample at this time was measured with a thermal conductivity detector and used as the adsorption gas amount v.

True Density Determined by Butanol Method

Measurements were performed using butanol in accordance with the method stipulated in JIS R7212. A summary is given below. Both the carbonaceous material obtained by heat-treating a carbonaceous precursor at 1100° C. and the carbonaceous material of the present invention were measured with the same measurement methods.

The mass ($m_1$) of a pycnometer with a bypass line having an internal volume of approximately 40 mL was precisely measured. Next, after a sample was placed flat at the bottom of the pycnometer so that the thickness of the sample is approximately 10 mm, the mass ($m_2$) was precisely measured. Next, 1-butanol was slowly added to the pycnometer to a depth of approximately 20 mm from the bottom. Next, the pycnometer was gently oscillated, and after the fact that no large air bubbles were formed was confirmed, the pycnometer was placed in a vacuum desiccator and gradually evacuated to a pressure of 2.0 to 2.7 kPa. The pressure was maintained for 20 minutes or longer, and after the generation of air bubbles stopped, the pycnometer was removed and further filled with 1-butanol. After a stopper was inserted, the pycnometer was immersed in a constant-temperature water bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured. Next, the same pycnometer was filled with 1-butanol alone and immersed in a constant-temperature water bath in the same manner as described above. After the liquid surface was aligned with the marked line, the mass ($m_3$) was measured. In addition, distilled water which was boiled immediately before use and from which the dissolved gas was removed was placed in the pycnometer and immersed in a constant-temperature water bath in the same manner as described above. After the liquid surface was aligned with the marked line was aligned, the mass ($m_5$) was measured. The true density ($\rho_{Bt}$) is calculated using the following equation.

$$\rho_{Bt} = \frac{m_2 - m_1}{m_2 - m_1 - (m_4 - m_3)} \times \frac{m_3 - m_1}{m_5 - m_1} d$$ (Equation 2)

(where, d is the specific gravity (0.9946) in water at 30° C.)

Average Particle Size

Three drops of a dispersant (cationic surfactant, "SN-WET 366" (manufactured by San Nopco Limited)) were added to approximately 0.1 g of a sample, and the dispersant was blended into the sample. Next, 30 mL of purified water was added, and after the sample was dispersed for approximately 2 minutes with an ultrasonic washer, the particle size distribution within a particle size range of 0.05 to 3000 μm was determined with a particle size distribution analyzer ("SALD-3000J" manufactured by Shimadzu Corporation).

The average particle size $D_{v50}$ (μm) was determined from the resulting particle size distribution as the particle size yielding a cumulative volume of 50%.

Example 1

First, 70 kg of a petroleum pitch with a softening point of 205° C., a H/C ratio of 0.65, and a quinoline insoluble content of 0.4 wt. % and 30 kg of naphthalene were charged into a pressure-resistant container with an internal volume of 300 liters and having a stirring blade and an outlet nozzle, and the substances were melted and mixed while heating. After the heat-melted and mixed petroleum pitch was cooled, the petroleum pitch was pulverized, and the obtained pulverized product was charged into water at 90 to 100° C., dispersed while stirring, and cooled to obtain a spherical pitch compact. After most of the water was removed by filtration, the naphthalene in the spherical pitch compact was extracted and removed with n-hexane. A porous spherical pitch obtained as described above was oxidized by heating while heated air was circulated, and heat-infusible porous spherical oxidized pitch was thus obtained. The oxygen content (degree of oxygen crosslinking) of the porous spherical oxidized pitch was 6 wt. %. Next, 200 g of the infusible porous spherical oxidized pitch was pulverized for 20 minutes with a jet mill (AIR JET MILL, manufactured by Hosokawa Micron Co., Ltd.; MODEL 100AFG) to form a pulverized carbonaceous material precursor with an average particle size of 20 to 25 μm. After the obtained pulverized carbonaceous material precursor was impregnated with a sodium carbonate ($Na_2CO_3$) aqueous solution in a nitrogen atmosphere, the precursor was subjected to heated dehydration under reduced pressure to obtain a pulverized carbonaceous material precursor impregnated with 38.0 wt. % of $Na_2CO_3$ with respect to the pulverized carbonaceous material precursor. Next, 10 g of the pulverized carbonaceous material precursor impregnated with $Na_2CO_3$ (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1200° C. at a heating rate of 250° C./h, held at 1200° C. for 1 hour and subjected to main heat treatment to obtain heat-treated carbon. Main heat treatment was performed in a nitrogen atmosphere with a flow rate of 10 L/min. Next, 5 g of the obtained heat-treated carbon was placed in a quartz reaction tube and heated and held at 750° C. under a nitrogen gas air flow. The heat-treated carbon was then coated with pyrolytic carbon by replacing the nitrogen gas flowing into the reaction tube with a mixed gas of hexane and nitrogen gas. The infusion rate of hexane was 0.3 g/min, and after infusion for 30 minutes, the supply of hexane was stopped. After the gas inside the reaction tube was replaced with nitrogen, the sample was allowed to cool to obtain a carbonaceous material 1. Note that the average particle size of the obtained carbonaceous material was 19 μm.

Example 2

First, 70 kg of a petroleum pitch with a softening point of 205° C., a H/C ratio of 0.65, and a quinoline insoluble content of 0.4 wt. % and 30 kg of naphthalene were charged into a pressure-resistant container with an internal volume of 300 liters and having a stirring blade and an outlet nozzle, and the substances were melted and mixed while heating. After the heat-melted and mixed petroleum pitch was then cooled, the petroleum pitch was pulverized, and the obtained pulverized product was charged into water at 90 to 100° C., dispersed while stirring, and cooled to obtain a spherical pitch compact. After most of the water was removed by filtration, the naphthalene in the spherical pitch compact was extracted and removed with n-hexane. A porous spherical pitch obtained as described above was oxidized by heating while heated air was circulated, and heat-infusible porous spherical oxidized pitch was thus obtained. The oxygen content (degree of oxygen crosslinking) of the porous spherical oxidized pitch was 18 wt. %. Next, 200 g of the infusible porous spherical oxidized pitch was pulverized for 20 minutes with a jet mill (AIR JET MILL, manufactured by Hosokawa Micron Co., Ltd.; MODEL 100AFG) to form a pulverized carbonaceous material precursor with an average particle size of from 20 to 25 μm. After the obtained pulverized carbonaceous material precursor was impregnated with a KOH aqueous solution in a nitrogen atmosphere, the precursor was subjected to heated dehydration under reduced pressure to obtain a pulverized carbonaceous material precursor impregnated with 30.0 wt. % of KOH with respect to the pulverized carbonaceous material precursor. Next, 10 g of the pulverized carbonaceous material precursor impregnated with a KOH (in terms of the mass of the pulverized carbon precursor) was placed in a horizontal tubular furnace and subjected to pre-heat treatment by holding the precursor for 2 hours at 600° C. in a nitrogen atmosphere, and the sample was then cooled. After the carbonaceous precursor that has been subjected to pre-heat treatment was placed in a beaker and sufficiently washed with ion-exchanged water to remove the alkali metal compound, followed by filtration, the carbonaceous precursor was dried at 105° C. in a nitrogen atmosphere. The water-washed carbonaceous precursor was heated to 1100° C. at a heating rate of 250° C./h in a nitrogen atmosphere, held at 1100° C. for 1 hour, and subjected to main heat treatment to obtain heat-treated carbon. Main heat treatment was performed in a nitrogen atmosphere with a flow rate of 10 L/min. Next, 5 g of the obtained heat-treated carbon was placed in a quartz reaction tube and heated and held at 750° C. under a nitrogen gas air flow. The heat-treated carbon was then coated with pyrolytic carbon by replacing the nitrogen gas flowing into the reaction tube with a mixed gas of hexane and nitrogen gas. The infusion rate of hexane was 0.3 g/min, and after infusion for 30 minutes, the supply of hexane was stopped. After the gas inside the reaction tube was replaced with nitrogen, the sample was allowed to cool to obtain a carbonaceous material 2. Note that the average particle size of the obtained carbonaceous material was 21 μm.

Example 3

A heat-treated carbon coated with pyrolytic carbon was obtained by repeating the operations of Example 1 with the exception that the oxygen content (degree of oxygen crosslinking) was set to 13 wt. % instead of 6 wt. %, that 7 wt. % of NaOH was added instead of 38 wt. % of $Na_2CO_3$, and that the heat-treated carbon was coated with pyrolytic carbon at a temperature of 700° C. instead of 750° C. Next, 5 g of this heat-treated carbon was placed in a horizontal tubular furnace and subjected to reheating treatment for 1 hour at 1100° C. in a non-oxidizing gas atmosphere to prepare a carbonaceous material 3. Note that the average particle size of the obtained carbonaceous material was 20 μm.

Example 4

A carbonaceous material 4 was prepared by repeating the operations of Example 1 with the exception that the oxygen content (degree of oxygen crosslinking) was set to 2 wt. % instead of 6 wt. %, and that 16.7 wt. % of NaOH was added instead of 38 wt. % of $Na_2CO_3$. Note that the average particle size of the obtained carbonaceous material was 18 μm.

Example 5

In a horizontal tubular furnace, 5 g of a heat-treated carbon prepared by repeating the operations of Example 4 was placed and subjected to reheating treatment for 1 hour at 1100° C. in a non-oxidizing gas atmosphere to prepare a carbonaceous material 5. Note that the average particle size of the obtained carbonaceous material was 18 μm.

Example 6

A carbonaceous material 6 was prepared by repeating the operations of Example 4 with the exception that 23.0 wt. % of NaOH was added instead of 16.7 wt. % of NaOH. Note that the average particle size of the obtained carbonaceous material was 18 μm.

Example 7

A carbonaceous material 7 was prepared by repeating the operations of Example 4 with the exception that 30.0 wt. % of NaOH was added instead of 16.7 wt. % of NaOH. Note that the average particle size of the obtained carbonaceous material was 18 μm.

Example 8

A carbonaceous material 8 was prepared by repeating the operations of Example 7 with the exception that the oxygen content (degree of oxygen crosslinking) was set to 6 wt. % instead of 2 wt. %. Note that the average particle size of the obtained carbonaceous material was 19 μm.

Example 9

A carbonaceous material 9 was prepared by repeating the operations of Example 6 with the exception that the oxygen content (degree of oxygen crosslinking) was set to 8 wt. % instead of 2 wt. %. Note that the average particle size of the obtained carbonaceous material was 19 μm.

Example 10

A carbonaceous material 10 was prepared by repeating the operations of Example 4 with the exception that the porous spherical pitch was not oxidized by heating. The oxygen content (degree of oxygen crosslinking) of the porous spherical oxidized pitch was 0 wt. % when heat treatment was not performed. Note that the average particle size of the obtained carbonaceous material was 18 μm.

Example 11

A carbonaceous material 11 was prepared by repeating the operations of Example 10 with the exception that 30.0 wt. % of NaOH was added instead of 16.7 wt. % of NaOH. Note that the average particle size of the obtained carbonaceous material was 18 μm.

Example 12

A carbonaceous material 12 was prepared by repeating the operations of Example 8 with the exception that the CVD treatment temperature was set to 900° C. instead of 750° C. Note that the average particle size of the obtained carbonaceous material was 19 μm.

Example 13

A carbonaceous material 13 was prepared by repeating the operations of Example 8 with the exception that the CVD treatment temperature was set to 1000° C. instead of 750° C. Note that the average particle size of the obtained carbonaceous material was 19 μm.

Example 14

A carbonaceous material 14 was prepared by repeating the operations of Example 12 with the exception that 33.0 wt. % of NaOH was added instead of 30.0 wt. % of NaOH. Note that the average particle size of the obtained carbonaceous material was 19 μm.

Example 15

A carbonaceous material 15 was prepared by repeating the operations of Example 8 with the exception that cyclohexane was used instead of hexane. Note that the average particle size of the obtained carbonaceous material was 19 μm.

Example 16

A carbonaceous material 16 was prepared by repeating the operations of Example 8 with the exception that butane was used instead of hexane. Note that the average particle size of the obtained carbonaceous material was 19 μm.

Example 17

After a coal pitch was pulverized to an average particle size of from 20 to 25 μm, the sample was oxidized by heating while heated air was circulated, and a pulverized carbonaceous precursor which was infusible with respect to heat was obtained. The oxygen content (degree of oxygen crosslinking) of the obtained pulverized carbonaceous precursor was 8 wt. %. After the obtained pulverized carbonaceous precursor was impregnated with a sodium hydroxide aqueous solution in a nitrogen atmosphere, the precursor was subjected to heated dehydration under reduced pressure to obtain a pulverized carbonaceous material precursor impregnated with 30.0 wt. % of sodium hydroxide with respect to the pulverized carbonaceous material precursor. Next, 10 g of the pulverized carbonaceous material precursor impregnated with sodium hydroxide (in terms of the mass of the pulverized carbon precursor) was placed in a horizontal tubular furnace and subjected to pre-heat treatment by holding the precursor for 10 hours at 600° C. in a nitrogen atmosphere. The precursor was further heated to 1200° C. at a heating rate of 250° C./h, held at 1200° C. for 1 hour and subjected to main heat treatment. Main heat treatment was performed in a nitrogen atmosphere with a flow rate of 10 L/min. Next, 5 g of the obtained heat-treated carbon was placed in a quartz reaction tube and heated and held at 750° C. under a nitrogen gas air flow. The heat-treated carbon was then coated with pyrolytic carbon by replacing the nitrogen gas flowing into the reaction tube with a mixed gas of hexane and nitrogen gas. The infusion rate of hexane was 0.3 g/min, and after infusion for 30 minutes, the supply of hexane was stopped. After the gas inside the reaction tube was replaced with nitrogen, the sample was allowed to cool to obtain a carbonaceous material 17.

Example 18

A heat-treated carbon coated with pyrolytic carbon was obtained by repeating the operations of Example 1 with the exception that the oxygen content (degree of oxygen crosslinking) was set to 14 wt. % instead of 6 wt. %, that 15 wt. % of NaOH was added instead of 38 wt. % of $Na_2CO_3$, and that the main heat treatment temperature was set to 1150° C. instead of 1200° C. Next, 5 g of this heat-treated carbon was placed in a horizontal tubular furnace and subjected to reheating treatment for 1 hour at 1100° C. in a non-oxidizing gas atmosphere to prepare a carbonaceous material 18. Note that the average particle size of the obtained carbonaceous material was 20 μm.

Example 19

A heat-treated carbon coated with pyrolytic carbon was obtained by repeating the operations of Example 2 with the exception that the oxygen content (degree of oxygen crosslinking) was set to 14 wt. % instead of 18 wt. %, that 7 wt. % of NaOH was added instead of 30 wt. % of KOH, and that the main heat treatment temperature was set to 1200° C. instead of 1100° C. Next, 5 g of this heat-treated carbon was placed in a horizontal tubular furnace and subjected to reheating treatment for 1 hour at 1100° C. in a non-oxidizing gas atmosphere to prepare a carbonaceous material 19. Note that the average particle size of the obtained carbonaceous material was 20 μm.

Comparative Example 1

A comparative carbonaceous material 1 was prepared by repeating the operations of Example 1 with the exception that the oxygen content (degree of oxygen crosslinking) was set to 16 wt. % instead of 6 wt. %, that alkali impregnation was not performed, and that CVD treatment was not performed. Note that the average particle size of the obtained carbonaceous material was 20 μm.

Comparative Example 2

A comparative carbonaceous material 2 was prepared by repeating the operations of Comparative Example 1 with the exception that the oxygen content (degree of oxygen crosslinking) was set to 6 wt. % instead of 16 wt. %. Note that the average particle size of the obtained carbonaceous material was 19 μm.

Comparative Example 3

A comparative carbonaceous material 3 was prepared by repeating the operations of Example 4 with the exception that the added amount of NaOH was set to 50.0 wt. % instead of 16.7 wt. % and that the heat-treated carbon was not coated with pyrolytic carbon. Note that the average particle size of the obtained carbonaceous material was 18 μm, and although an attempt was made to produce an electrode with the same method as in Example 1, the specific surface area was large, and it was difficult to produce an electrode.

Comparative Example 4

A comparative carbonaceous material 4 was prepared by repeating the operations of Comparative Example 1 with the exception that the oxygen content (degree of oxygen crosslinking) was set to 18 wt. % instead of 16 wt. % and that the main heat treatment temperature was set to 800° C. instead of 1200° C. Note that the average particle size of the obtained carbonaceous material was 20 μm.

Comparative Example 5

A carbonaceous material 5 was prepared by repeating the operations of Comparative Example 4 with the exception that the main heat treatment temperature was set to 1500° C. instead of 800° C. Note that the average particle size of the obtained carbonaceous material was 20 μm.

Non-aqueous electrolyte secondary batteries were produced by means of the following operations (a) and (b) using the electrodes obtained in Examples 1 to 17 and Comparative Examples 1 to 5, and the electrode and battery performances thereof were evaluated.

(a) Production of Test Battery

Although the carbon material of the present invention is suitable for forming an anode for a non-aqueous electrolyte secondary battery, in order to precisely evaluate the discharge capacity (de-doping capacity) and the irreversible capacity (non-de-doping capacity) of the battery active material without being affected by fluctuation in the performances of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016-size coin-type battery can in advance, punching a thin sheet of metal lithium with a thickness of 0.8 mm into a disc shape with a diameter of 15 mm, and pressing the thin sheet of metal lithium into the stainless steel mesh disc.

Using a pair of electrodes produced in this way, $LiPF_6$ was added at a proportion of 1.5 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 19 mm to assemble a 2016 coin-type non-aqueous electrolyte lithium secondary battery in an Ar glove box.

(b) Measurement of Battery Capacity

Charge-discharge tests were performed on a lithium secondary battery with the configuration described above using a charge-discharge tester ("TOSCAT" manufactured by Toyo System Co., Ltd.). Here, in a battery including a lithium chalcogen compound for the cathode, the doping reaction for doping lithium into the carbon electrode is called "charging", and in a battery including lithium metal for a counter electrode, as in the test battery of the present invention, the doping reaction for the carbon electrode is called "discharging". The manner in which the doping reactions for doping lithium into the same carbon electrode thus differs depending on the pair of electrodes used. Therefore, the doping reaction for doping lithium into the carbon electrode will be described as "charging" hereafter for the sake of convenience. Conversely, "discharging" refers to a charging reaction in the test battery but is described as "discharging" for the sake of convenience since it is a de-doping reaction for removing lithium from the carbon material. A doping reaction was performed by repeating an operation of turning on the power for 1 hour at a current density of 0.5 mA/cm² and then pausing for 2 hours until the equilibrium potential between terminals reached 5 mV. A value determined by dividing the amount of electricity at this time by the weight of carbonaceous material that was used was defined as the doping capacity, which was expressed in units of mAh/g. Next, a current was fed in the same manner but in the opposite direction to de-dope the carbonaceous material of the lithium with which it was doped. De-doping was performed by repeating an operation of turning on the power for 1 hour at a current density of 0.5 mA/cm² and then pausing for 2 hours, and terminal potential of 1.5 V was used as the cutoff voltage. At this time, a value determined by dividing the amount of the electrical discharge by the weight of the carbon material of the electrode is defined as the discharge capacity per unit weight of the carbon material (Ah/g). Furthermore, the product of the discharge capacity per unit weight and the true density was used as the discharge capacity per unit volume (Ah/L). In addition, the charge/discharge efficiency was determined by dividing the discharge capacity per unit weight by the charge capacity per unit weight. The charge/discharge efficiency was recorded as a percentage (%).

The charge/discharge capacities and the charge/discharge efficiency were calculated by averaging three measurements for test batteries produced using the same sample.

Table 1-I

| | Carbonaceous precursor | | | | Addition of alkali | | Alkali washing after | Main heat |
| | Raw material | Oxygen content wt. % | H/C | True density g/cm³ | Alkali type | Added amount wt. % | pre-heat treatment at 600° C. | treatment temperature ° C. |
|---|---|---|---|---|---|---|---|---|
| Example 1 | Petroleum | 6 | 0.59 | 1.63 | Na$_2$CO$_3$ | 38.0 | No | 1200 |
| Example 2 | Petroleum | 18 | 0.45 | 1.51 | KOH | 30.0 | Yes | 1100 |
| Example 3 | Petroleum | 13 | 0.51 | 1.55 | NaOH | 7.0 | No | 1200 |
| Example 4 | Petroleum | 2 | 0.63 | 1.95 | NaOH | 16.7 | No | 1200 |
| Example 5 | Petroleum | 2 | 0.63 | 1.95 | NaOH | 16.7 | No | 1200 |
| Example 6 | Petroleum | 2 | 0.63 | 1.95 | NaOH | 23.0 | No | 1200 |
| Example 7 | Petroleum | 2 | 0.63 | 1.95 | NaOH | 30.0 | No | 1200 |
| Example 8 | Petroleum | 6 | 0.59 | 1.63 | NaOH | 30.0 | No | 1200 |
| Example 9 | Petroleum | 8 | 0.57 | 1.57 | NaOH | 23.0 | No | 1200 |
| Example 10 | Petroleum | 0 | 0.64 | 2.01 | NaOH | 16.7 | No | 1200 |
| Example 11 | Petroleum | 0 | 0.64 | 2.01 | NaOH | 30.0 | No | 1200 |
| Example 12 | Petroleum | 6 | 0.59 | 1.63 | NaOH | 30.0 | No | 1200 |
| Example 13 | Petroleum | 6 | 0.59 | 1.63 | NaOH | 30.0 | No | 1200 |
| Example 14 | Petroleum | 6 | 0.59 | 1.63 | NaOH | 33.0 | No | 1200 |
| Example 15 | Petroleum | 6 | 0.59 | 1.63 | NaOH | 30.0 | No | 1200 |
| Example 16 | Petroleum | 6 | 0.59 | 1.63 | NaOH | 30.0 | No | 1200 |
| Example 17 | Coal | 8 | 0.50 | 1.64 | NaOH | 30.0 | No | 1200 |
| Example 18 | Petroleum | 14 | 0.50 | 1.54 | NaOH | 15.0 | No | 1150 |
| Example 19 | Petroleum | 14 | 0.50 | 1.54 | NaOH | 7.0 | Yes | 1200 |
| Comparative Example 1 | Petroleum | 16 | 0.48 | 1.52 | — | — | No | 1200 |
| Comparative Example 2 | Petroleum | 6 | 0.59 | 1.63 | — | — | No | 1200 |
| Comparative Example 3 | Petroleum | 2 | 0.63 | 1.95 | NaOH | 50 | No | 1200 |
| Comparative Example 4 | Petroleum | 18 | 0.45 | 1.51 | — | — | No | 800 |
| Comparative Example 5 | Petroleum | 18 | 0.45 | 1.51 | — | — | No | 1500 |

Table 1-II

| | CVD treatment | | Reheating treatment |
| | Gas type | Temperature ° C. | temperature ° C. |
|---|---|---|---|
| Example 1 | Hex.[1] | 750 | No |
| Example 2 | Hex. | 750 | No |
| Example 3 | Hex. | 700 | 1100 |
| Example 4 | Hex. | 750 | No |
| Example 5 | Hex. | 750 | 1100 |
| Example 6 | Hex. | 750 | No |
| Example 7 | Hex. | 750 | No |
| Example 8 | Hex. | 750 | No |
| Example 9 | Hex. | 750 | No |
| Example 10 | Hex. | 750 | No |
| Example 11 | Hex. | 750 | No |
| Example 12 | Hex. | 900 | No |
| Example 13 | Hex. | 1000 | No |
| Example 14 | Hex. | 900 | No |
| Example 15 | c-Hex.[2] | 750 | No |
| Example 16 | But.[3] | 750 | No |
| Example 17 | Hex. | 750 | No |

-continued

| | | | |
|---|---|---|---|
| Example 18 | Hex. | 750 | 1100 |
| Example 19 | Hex. | 750 | 1100 |
| Comparative Example 1 | — | — | No |
| Comparative Example 2 | — | — | No |
| Comparative Example 3 | — | — | No |
| Comparative Example 4 | — | — | No |
| Comparative Example 5 | — | — | No |

Table 1-III

| | Carbonaceous material | | | | | |
|---|---|---|---|---|---|---|
| | Particle size | H/C | True density | SSA | Discharge capacity | | Charging and discharging Efficiency |
| | μm | | g/cm$^3$ | m$^2$/g | Ah/kg | Ah/L | % |
| Example 1 | 19 | 0.03 | 1.45 | 5.9 | 581 | 842 | 87.5 |
| Example 2 | 21 | 0.04 | 1.41 | 1.7 | 586 | 826 | 84.3 |
| Example 3 | 20 | 0.03 | 1.49 | 2.3 | 554 | 825 | 90.1 |
| Example 4 | 18 | 0.03 | 1.43 | 2.1 | 583 | 834 | 86.0 |
| Example 5 | 18 | 0.03 | 1.43 | 3.9 | 580 | 829 | 89.4 |
| Example 6 | 18 | 0.03 | 1.38 | 2.9 | 648 | 894 | 86.1 |
| Example 7 | 18 | 0.03 | 1.34 | 3.7 | 655 | 878 | 83.4 |
| Example 8 | 19 | 0.03 | 1.33 | 3.6 | 663 | 882 | 85.3 |
| Example 9 | 19 | 0.03 | 1.37 | 2.8 | 636 | 871 | 87.4 |
| Example 10 | 18 | 0.03 | 1.40 | 2.2 | 612 | 857 | 86.8 |
| Example 11 | 18 | 0.03 | 1.36 | 2.3 | 646 | 879 | 85.7 |
| Example 12 | 19 | 0.03 | 1.33 | 3.5 | 669 | 890 | 86.4 |
| Example 13 | 19 | 0.03 | 1.38 | 9.2 | 625 | 863 | 84.5 |
| Example 14 | 19 | 0.03 | 1.42 | 5.8 | 597 | 848 | 81.6 |
| Example 15 | 19 | 0.03 | 1.33 | 2.7 | 628 | 835 | 86.2 |
| Example 16 | 19 | 0.03 | 1.33 | 3.1 | 635 | 845 | 85.2 |
| Example 17 | 19 | 0.03 | 1.34 | 3.3 | 631 | 846 | 84.1 |
| Example 18 | 20 | 0.04 | 1.40 | 1.8 | 579 | 810 | 87.9 |
| Example 19 | 20 | 0.03 | 1.52 | 1.9 | 553 | 841 | 89.5 |
| Comparative Example 1 | 20 | 0.03 | 1.52 | 3.1 | 473 | 719 | 88.4 |
| Comparative Example 2 | 19 | 0.03 | 1.63 | 2.0 | 414 | 675 | 88.4 |
| Comparative Example 3 | 18 | 0.03 | 1.09 | 1132 | — | — | — |
| Comparative Example 4 | 20 | 0.14 | 1.45 | 82 | 536 | 777 | 57.4 |
| Comparative Example 5 | 20 | 0.01 | 1.55 | 2.4 | 187 | 290 | 86.2 |

1) n-hexane was abbreviated as Hex.
2) Cyclohexane was abbreviated as c-Hex.
3) Butane was abbreviated as But.

The secondary batteries produced using the carbonaceous materials of Examples 1 to 19 exhibited high discharge capacities from 553 to 663 Ah/kg and from 810 to 890 Ah/L. The reason for this was that the carbonaceous materials of Examples 1 to 19 were obtained by performing alkali impregnation and CVD treatment. On the other hand, secondary batteries including the carbonaceous materials of Comparative Examples 1, 2, 4, and 5, which were not subjected to alkali impregnation and/or CVD treatment, did not yield high discharge capacities.

INDUSTRIAL APPLICABILITY

The non-aqueous electrolyte secondary battery of the present invention has a high discharge capacity and excellent charge/discharge efficiency. Therefore, the battery can be effectively used in hybrid electric vehicles (HEVs), plug-in hybrid electric vehicles (PHEVs), and electric vehicles (EVs).

The present invention has been described above using specific aspects of embodiment, but modifications and improvements apparent to persons having ordinary skill in the art are also included in the scope of the present invention.

The invention claimed is:
1. A method for producing a carbonaceous material for a non-aqueous electrolyte secondary battery anode, the method comprising:
  (1) an alkali impregnating step of adding an alkali metal and/or a chemical compound containing an elemental alkali metal to a carbonaceous precursor to obtain an alkali-impregnated carbonaceous precursor;
  (2) a heat treatment step of:
    (a) obtaining a heat-treated product by performing main heat treatment on the alkali impregnated carbonaceous precursor at 800° C. to 1500° C. in a non-oxidizing gas atmosphere, or

(b) obtaining a heat-treated product by performing pre-heat treatment on the alkali-impregnated carbonaceous precursor at a temperature of not lower than 400° C. and lower than 800° C. in a non-oxidizing gas atmosphere and then performing main heat treatment at 800° C. to 1500° C. in a non-oxidizing gas atmosphere; and (3) coating the heat-treated product with pyrolytic carbon, wherein the alkali impregnating step includes a step of i) mixing the alkali metal and/or the compound containing elemental alkali metal with the carbonaceous precursor in a powder state, or ii) dissolving the compound containing elemental alkali metal in a solvent to prepare a solution of the compound containing elemental alkali metal, mixing the solution of the compound containing elemental alkali metal with the carbonaceous precursor, followed by volatilizing the solvent, so to prepare the alkali impregnated carbonaceous precursor in which the alkali metal or the compound containing elemental alkali metal is impregnated, and the obtained carbonaceous material has a specific surface area of not greater than 10 $m^2/g$, the specific surface area being determined by a BET method using nitrogen adsorption.

2. The method for producing a carbonaceous material for a non-aqueous electrolyte secondary battery anode according to claim 1, the method further comprising (4) performing heat treatment at 800° C. to 1500° C. in a non-oxidizing gas atmosphere.

3. The method for producing a carbonaceous material for a non-aqueous electrolyte secondary battery anode according to claim 1, wherein an added amount of the alkali metal and the chemical compound containing an elemental alkali metal in the alkali-impregnated carbonaceous precursor is not less than 5 wt. % and not greater than 70 wt. %.

4. The method for producing a carbonaceous material for a non-aqueous electrolyte secondary battery anode according to claim 1, wherein the heat treatment step (2)(a) is (2) a heat treatment step of (a1) performing main heat treatment on the alkali-impregnated carbonaceous precursor at 800° C. to 1500° C. in a non-oxidizing gas atmosphere and then removing alkali metals and compounds containing elemental alkali metals by washing; or the heat treatment step (2)(b) is (2) a heat treatment step of (b1) performing pre-heat treatment on the alkali-impregnated carbonaceous precursor at a temperature of not lower than 400° C. and lower than 800° C. in a non-oxidizing gas atmosphere, removing alkali metals and compounds containing elemental alkali metals by washing, and then performing main heat treatment at 800° C. to 1500° C. in a non-oxidizing gas atmosphere to obtain a heat-treated product, or (b2) performing pre-heat treatment on the alkali-impregnated carbonaceous precursor at a temperature of not lower than 400° C. and lower than 800° C. in a non-oxidizing gas atmosphere, performing main heat treatment at 800° C. to 1500° C. in a non-oxidizing gas atmosphere, and then removing alkali metals and compounds containing elemental alkali metals by washing.

5. The method for producing a carbonaceous material for a non-aqueous electrolyte secondary battery anode according to claim 1, wherein the carbonaceous precursor contains a petroleum pitch or tar, a coal pitch or tar, a thermoplastic resin, or a thermosetting resin as a carbon source.

6. A carbonaceous material for a non-aqueous secondary battery anode obtained by the production method according to claim 1.

7. The carbonaceous material for a non-aqueous secondary battery anode according to claim 6, wherein a true density is from 1.20 $g/cm^3$ to 1.60 $g/cm^3$, an average particle size is not greater than 50 μm, and an atom ratio (H/C) of hydrogen atoms to carbon atoms determined by elemental analysis is not greater than 0.1.

8. An anode for a non-aqueous electrolyte secondary battery comprising the carbonaceous material according to claim 6.

9. A non-aqueous electrolyte secondary battery comprising the carbonaceous material according to claim 6.

10. The method for producing a carbonaceous material for a non-aqueous electrolyte secondary battery anode according to claim 1, wherein average particle size of the carbonaceous precursor is not greater than 600 μm.

11. The method for producing a carbonaceous material for a non-aqueous electrolyte secondary battery anode according to claim 1, wherein average particle size of the carbonaceous precursor is not greater than 600 μm, and the alkali metal compound is a hydroxide, a carbonate, a hydrogen carbonate, or a halogen compound of an alkali metal.

12. The method for producing a carbonaceous material for a non-aqueous electrolyte secondary battery anode according to claim 1, wherein average particle size of the carbonaceous precursor is not greater than 600 μm, and an added amount of the alkali metal and the chemical compound containing an elemental alkali metal in the alkali-impregnated carbonaceous precursor is not less than 5 wt. % and not greater than 70 wt. %.

13. The method for producing a carbonaceous material for a non-aqueous electrolyte secondary battery anode according to claim 1, wherein average particle size of the carbonaceous precursor is not greater than 600 μm, the alkali metal compound is a hydroxide, a carbonate, a hydrogen carbonate, or a halogen compound of an alkali metal, and an added amount of the alkali metal and the chemical compound containing an elemental alkali metal in the alkali-impregnated carbonaceous precursor is not less than 5 wt. % and not greater than 70 wt. %.

* * * * *